United States Patent [19]

Kashiwagi et al.

[11] Patent Number: 5,563,807
[45] Date of Patent: Oct. 8, 1996

[54] INFORMATION PROCESSING SYSTEM AND METHOD FOR LENS ARRANGEMENT

[75] Inventors: Naoki Kashiwagi; Shin Yamaguchi, both of Hiratsuka; Hironobu Araki; Keiko Iijima, both of Tokyo; Junko Nakatsu, Kawaguchi, all of Japan

[73] Assignee: Canon Kabushiki Kaisha, Tokyo, Japan

[21] Appl. No.: 180,323

[22] Filed: Jan. 12, 1994

[30] Foreign Application Priority Data

Jan. 18, 1993 [JP] Japan ................................. 5-006031

[51] Int. Cl.⁶ ................................................. G01M 11/00
[52] U.S. Cl. ............................................ 364/525; 359/900
[58] Field of Search ............................. 364/525, 474.24, 364/578; 359/362, 365, 900; 356/388; 395/500

[56] References Cited

U.S. PATENT DOCUMENTS 5,233,472  8/1993  Haraguchi et al. ..................... 395/900
5,388,006  2/1995  Koelsch .................................. 395/900

OTHER PUBLICATIONS

GENTI-PC Reference Manual, Genesee Computer Center, Inc., Jul. 1985.

*Primary Examiner*—Emanuel T. Voeltz
*Assistant Examiner*—Edward Pipala
*Attorney, Agent, or Firm*—Fitzpatrick, Cella, Harper & Scinto

[57] ABSTRACT

An information processing system by which it is possible to easily define a lens arrangement and thus make it is possible to easily perform an optical evaluation, wherein a plurality of object positions may be defined for the same focal length of an optical lens system. A lens is designated as the lens used for focusing, and the values to be changed, such as the distances between lenses, are calculated and defined corresponding to the object positions. The arrangement of an optical system may be defined in a plurality of hierarchy levels, and information on decentering may be defined for each decentered configuration of each group including the lens faces.

14 Claims, 37 Drawing Sheets

OBJECT POSITION ( 1 )

OBJECT POSITION ( 2 )

FIG. 16
OPTICAL SUBSYSTEM (1)
LENS FACE NUMBER  1  2  3 4  5 6
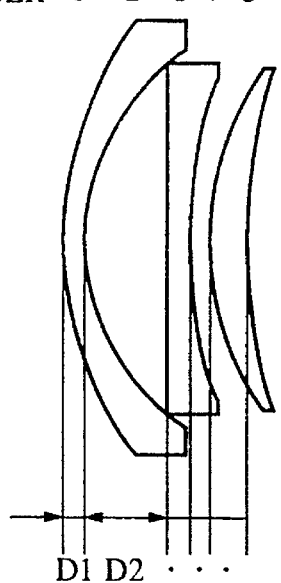
D1 D2 · · ·
(2)
7 8 9 10 12 14 16
     11   13 15 17
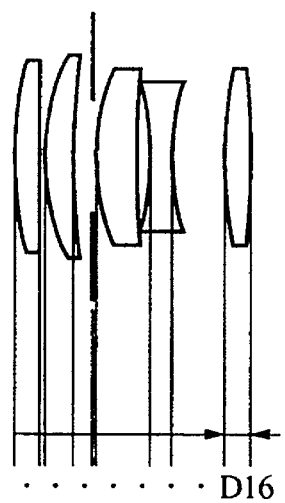
· · · · · · D16

FOCAL LENGTH OF LENS ( A )

OBJECT POSITION    IMAGE EVALUATION POSITION

FOCAL LENGTH OF LENS ( B )

OBJECT POSITION    IMAGE EVALUATION POSITION

FIG. 24
OPTICAL SUBSYSTEM (1) (2)
LENS FACE NUMBER  1  2  3 4  5 6    7 8 9 10 12  14  16
                                         11   13  15  17
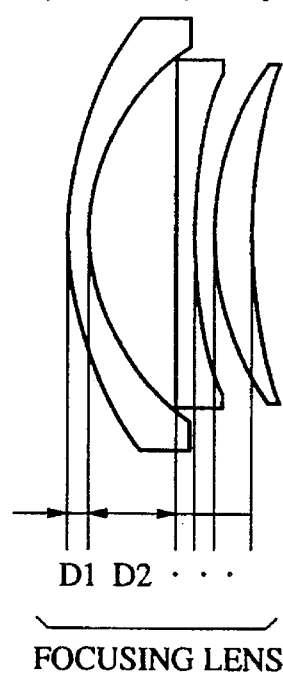
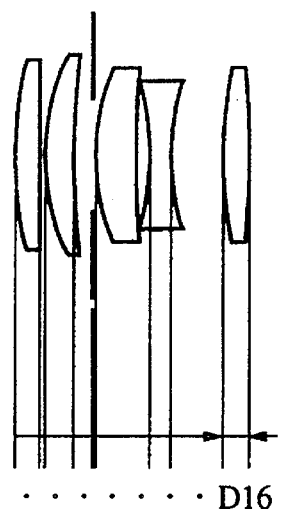
D1 D2 · · ·                          · · · · · · · D16
FOCUSING LENS OBJECT POSITION (1)
FOCUSING LENS
FOCAL LENGTH OF LENS (A)
IMAGE EVALUATION POSITION OBJECT POSITION (1)
FOCUSING LENS
FOCAL LENGTH OF LENS (B)
IMAGE EVALUATION POSITION

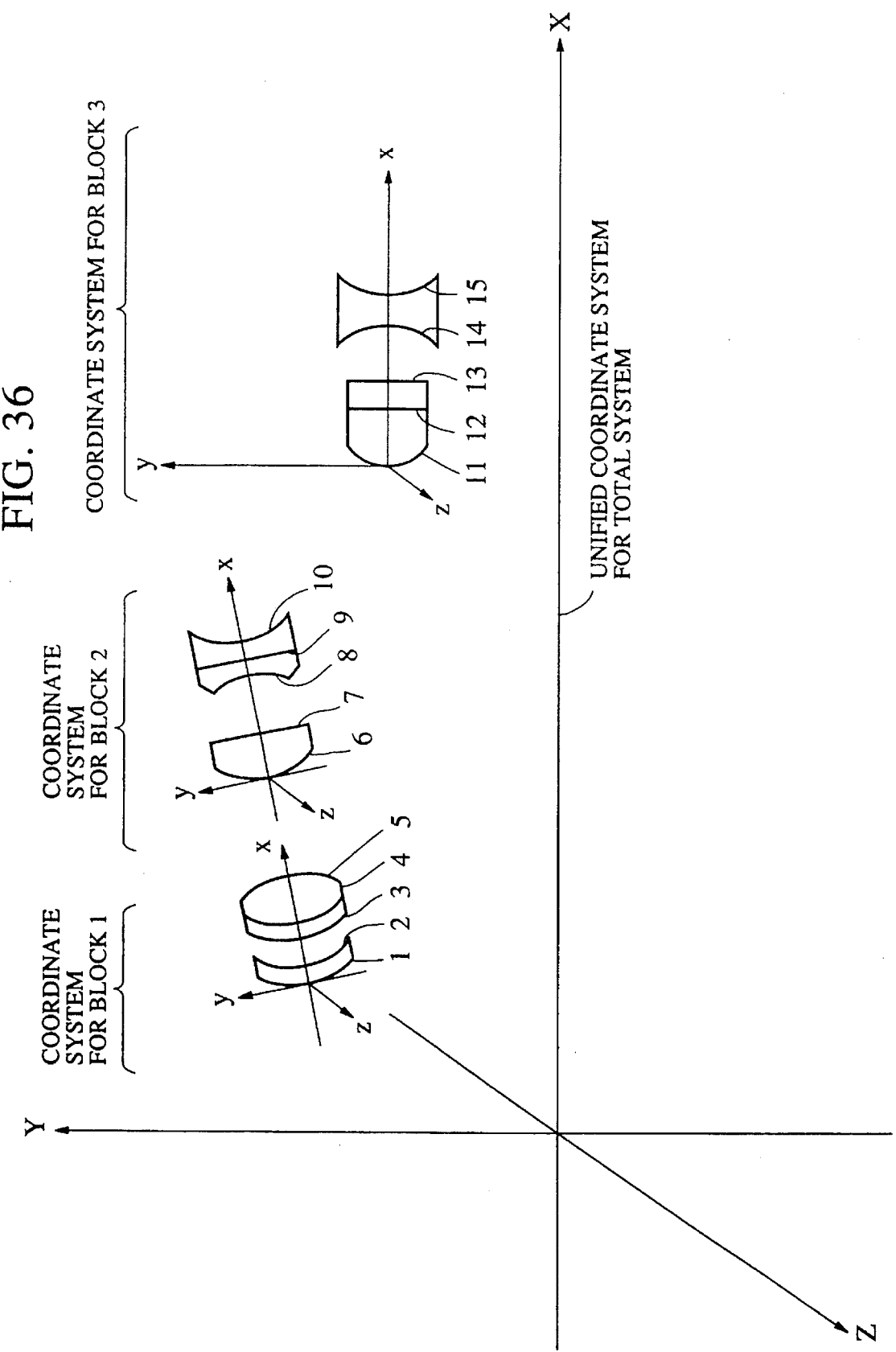

GROUP 1 : FACES 1 - 4
GROUP 2 : FACE 5
GROUP 3 : FACES 6 - 9
GROUP 4 : FACES 10 - 13

INFORMATION PROCESSING SYSTEM AND METHOD FOR LENS ARRANGEMENT

BACKGROUND OF THE INVENTION

1. Field of the Invention

The present invention relates to an information processing system, and particularly to an information processing system for use in the design of a lens system.

2. Description of the Related Art

When an optical system is simulated by using an optical CAD (computer aided design) system, the data regarding the optical lens system should be defined in the CAD system as a matter of course.

The data with respect to the optical lens system that should be defined includes arrangement data such as the radius of curvature of a lens, the distance between lens faces, and the refractivity, which depends on the lens material simulated, and also includes evaluating position data such as the position of an object, and the evaluating image position.

With recent expanding applications of the optical technologies, various types of optical lens systems have been developed.

In the optical CAD system used for this purpose, it is required that various kinds of data associated with an optical lens system be easily defined in a manner which can fit with the actual development approach.

Taking a zoom lens as an example, a method of data definition with a conventional CAD system will be described below.

One known CAD system for such a purpose is the CAD system CODE-V, which is available from Optical Research Associates.

In this optical CAD system, the data associated with a zoom lens may be defined as follows:

(1) Input information on the evaluating light such as the wavelength, F-number, angle of view, and ratio of pupil diameter;
(2) Input data representing the lens configuration such as the radius of curvature, the distance between lens faces, lens material, as well as the position and diameter of the diaphragm, which are associated with the respective lenses comprising the optical lens system; and
(3) Evaluate positions such as the position of an object, and the evaluating position of an image.

In the case of an optical lens system of a camera, the position of an object and the evaluating position of an image correspond to the position of an object to be photographed and the position of a film plane, respectively.

Then, the data of the optical lens system that has been defined in such a way as described above is used as the reference data to represent the standard conditions for describing a plurality of conditions, i.e., the zooming condition in this case, of the optical system. In this definition, the lens faces whose positions are variable are specified by their numbers, and variable parameters are used as the face distances belonging to respective lens faces.

In this optical CAD system, data regarding the evaluating positions such as the position of an object and the evaluating position of the image can be defined such that only one common set of the data need be given for all optical lens system conditions.

In another known optical CAD system called OPTEDGE, which is available from Minolta Camera Co., Ltd., data regarding evaluating positions such as the position of an object and the evaluating position of the image can be defined such that one set of the data may be given separately for each optical lens system condition.

In this system, as in the CODE-V system, initial input data regarding the optical lens system is used as the reference data representing the standard conditions, and based on this reference data, a plurality of conditions, i.e., the zooming condition, of the optical system can be defined in such a way that the lens faces whose positions are variable are specified by their numbers, and the variable parameters are used as the face distances belonging to respective lens faces.

The position information of the optical system represents the vertex position and the inclination of each lens face of respective optical elements which comprise the complete optical system.

When an optical system that is decentered is designed using a conventional simulation system, the arrangements of the optical elements should be given for each lens face by defining its 3-dimensional location and its inclination and the like.

Referring to FIG. 47, one example will be described below.

In the optical system shown in FIG. 47, the coordinate of a face vertex (solid dots along the axis in FIG. 38) should be given for each face to define the position data of each optical element.

In this figure, the origin of an absolute coordinate system is assigned to (0,0,0) corresponding to the face vertex of lens face 1. However, the origin can be assigned to an arbitrary position.

More specifically, each arrangement of lens faces 1 through 13 is described by using 3-dimensional coordinates in the absolute coordinate system (the coordinates seen from the face vertex of the face 1). It will be a very troublesome task for a user to input the data after calculating the 3-dimensional coordinates for all faces ((x2, y2, z2), . . . , (x13, y13, z13)).

Furthermore, as various kinds of optical systems have appeared, decentered lens systems become used more often, and it becomes desirable for a simulation system to include 3-dimensional information.

When a decentered optical system is designed with a conventional simulation system, the origin, the inclination of the coordinates, and the rotation data should be given for each lens face.

In conventional techniques, there are no simulation systems in which a plurality of lens faces are combined into one unit so that the unit has information representing the decentering.

Yoshinari Matsui describes in his book entitled "The Design of a Lens System" that the development of a lens is an approach to establish design specifications which generally define conditions of performance or dimensions that the optical system should meet.

The first step of this approach is to review previously developed optical systems that are similar to the optical system to be developed. From the conclusion of the review, a basic design is established and the target performance and the type of lens are determined. Then, the power arrangement is determined for the optical lens system by means of approximated calculation.

While maintaining the determined power arrangement, the configuration is then determined as a thin-walled lens system in which the optical system is composed of lenses whose thicknesses can be neglected compared to the refractivity-dependent radius of curvature.

Then, thicknesses are introduced in the configuration which has been determined as the thin-walled lens system and thus specific shapes of the lenses are determined. The design of a lens is carried out according to such a procedure described above.

The determination of the power arrangement is an approach carried out to satisfy the design specifications by regarding the total optical lens system as a combination of a plurality of optical subsystems and by determining the power of the individual optical subsystems and the distances between the principal points of the optical subsystems.

In the designing of a lens system, it is important to determine the specific shapes of the individual optical subsystems without breaking the power arrangement. To this end, an optical CAD system is used to evaluate and investigate the optical system, and to determine the specific shapes of the lenses.

A zoom lens is an optical system in which the focal length of the total optical lens system can be continuously changed without changing the position of the image point, by changing the distance between the principal points of optical subsystems along the optical axis.

The distances between respective optical subsystems, which were determined when the power arrangement was determined, correspond to the distances between principal points of respective optical subsystems in the actual configuration.

Referring to FIG. 41 and 42, the distance between optical subsystems 1 and 2, which was determined during the power arrangement, corresponds to the distance between the image-side principal point of optical subsystem 1 and the object-side principal point of optical subsystem 2 in the actual configuration.

As a result, if a zoom lens system is defined in an optical CAD system according to a conventional method of inputting the data of an optical lens system, a variable parameter is not given as a distance between optical subsystems as described above, but it is necessary to specify the numbers of the lens faces whose distances are to be varied and it is necessary to define a variable parameter as a distance between faces that belong to the face.

Therefore, to determined a specific shape of a lens, the position of the principal point in this specific shape of the lens should be calculated and the parameter representing the distance between faces belonging to the face should by determined by specifying the number of the lens face to be varied. Thus, a very troublesome task is required to define the data of the optical system in an optical CAD system.

Furthermore, because only one object position can be defined for one condition of an optical lens system, if an optical evaluation for different positions of the object is required for a certain focal length of the optical lens system, the data should be defined separately for each condition of the optical lens system corresponding to each object position. As a result, for each given object position, a condition should be calculated in which focusing is adjusted depending on the position of the object so that the conjugate plane with respect to the object position may coincide with the evaluating position of the image. Then, the number of the variable face to be varied for focusing should be specified and the distance between faces belonging to the face should be given as the result that was calculated in such a way as described above. Unless such a very troublesome task is carried out, the desired evaluation cannot be accomplished.

For example, to define the respective conditions shown in FIGS. 43 and 44, the data representing each condition of the optical system should be separately given to perform an optical evaluation.

FIG. 43 shows a condition of an optical lens system where focusing is adjusted to an infinite object position. FIG. 44 shows a condition of the optical lens system where focusing is adjusted to an object position which is 20 cm distant.

In the case of an optical lens system of a camera shown in FIGS. 45 and 46, to make an optical evaluation of this optical system with respect to the two different positions of an object to be photographed, i.e., infinite and short distance positions, a focusing condition should be calculated in which the conjugate plane of the object position may coincide with the evaluating position of the image, i.e., the image is in focus, and then the data should be input separately for each of two conditions so that the data may represent the conditions shown in FIGS. 45 and 46.

In the case of the optical system shown in FIGS. 45 and 46, focusing is carried out by moving the position of the lens that is first when counted from the object side.

In some cases, an optical system comprises a large number of lens faces such as a few tens of lens faces, and it would be a very troublesome task for a user to input position data for each face, and input errors would often occur. Even if only a portion of the data representing the 3-dimensional positions of the respective faces of a group of optical elements is different, the data similar to each group would have to be input repeatedly.

To determine the spatial location for each lens face of a decentered optical system for each of the different zooming conditions, a memory area should be designated for the spatial locations corresponding to the number of different zooming conditions for each of the lens faces, which requires an unnecessarily large memory capacity. Thus, if a large number of zooming conditions are required, then the memory area for spatial locations should be expanded.

SUMMARY OF THE INVENTION

One of the objectives of the present invention is to provide an information processing system by which optical systems, such as a zoom lens system, can be easily described in an optical CAD system according to the actual development approach of an optical lens system, in which the data used for the optical evaluation is generated from data of an optical subsystem and the data of the lens configuration of the optical subsystem are input by a user.

Another objective of the present invention is to provide an information processing system in which optical elements of an optical system can be grouped into hierarchy levels, and the optical system configuration can be defined for each hierarchy level group.

It is another object of the present invention to provide an information processing system which requires only a small amount of memory and which can be used for various kinds of simulation of decentered optical systems.

According to one aspect of the present invention, an information processing system comprises configuration definition means for defining data of a lens configuration; subsystem definition means for defining data of optical subsystems; evaluating-position definition means for defining evaluating-position data; and generating means for generating condition data of an optical system, based on the data defined by the configuration definition means, the subsystem definition means, and the evaluating-position definition means.

According to another aspect of the present invention, an information processing system comprises configuration definition means for defining data of a lens configuration; subsystem definition means for defining data of optical subsystems; evaluating-position definition means for defining evaluating-position data; focusing definition means for specifying a focusing lens face; and spacing definition means for defining a distance between lenses, based on the data defined by the configuration definition means, the subsystem definition means, the evaluating-position definition means, and the focusing definition means.

According to another aspect of the present invention, an information processing system comprises information definition means for defining an evaluating light; configuration definition means for defining data of a lens configuration; evaluating-position definition means for defining evaluating-position data; focusing definition means for specifying a focusing lens face; and spacing definition means for defining a distance between lenses, based on the data defined by the information definition means, the configuration definition means, the evaluating-position definition means, and the spacing definition means.

According to another aspect of the present invention, an information processing system comprises configuration definition means for defining data of a lens configuration; subsystem definition means for defining data of an optical subsystem from the data defined by the configuration definition means; hierarchy level definition means for defining a hierarchy level of position data included in the data defined by the subsystem definition means.

According to another aspect of the present invention, an information processing system comprises configuration definition means for defining data of a lens configuration; subsystem definition means for defining data of an optical subsystem from the data defined by the configuration definition means; decentering definition means for defining decentering information for the data defined by the subsystem definition means; generating means for generating data of the optical lens system based on the data defined by the configuration definition means, the subsystem definition means, and the decentering definition means.

According to another aspect, the present invention relates to an information processing system for processing information regarding a lens system, the processing system comprising configuration definition means for receiving input lens system data and for generating data defining the configuration of the lens system, block definition means for receiving block composition data and for generating data defining an arrangement of a plurality of blocks that form the configuration of the lens system, position definition means for receiving at least one of object and image position data and for generating data defining evaluating-positions for the lens system in accordance with at least one of the object and image position data, and arrangement means for arranging lens within the lens system based on the respective data generated by the configuration definition means, the block definition means and the position definition means.

According to still another aspect, the present invention relates to an information processing system for processing information regarding a lens system, the processing system comprising configuration definition means for receiving input lens system data and for generating data defining the configuration of the lens system, designation means for receiving the lens system configuration data from the configuration definition means and for designating a reference lens from the lenses within the lens system defined by the configuration definition means, block defining means for receiving block composition data defining a block having the reference lens designated by the designation means, and dependent lenses, which are not designated by the designation means, arrangement definition means for receiving the data regarding the block defined by the block defining means and for defining a position of the reference lens in the block, and re-arrangement determining means for determining a re-arrangement of the dependent lens relative to the reference lens in accordance with the position of the reference lens defined by the arrangement defining means.

According to still another aspect, the present invention relates to a method for processing information regarding a lens system, the method comprising the steps of generating configuration data regarding the configuration of lenses within the lens system in accordance with input lens system data, defining the arrangement of a plurality of blocks that form the configuration of the lens system in accordance with block composition data and the lens system configuration data generated in the generating step, generating evaluating-position data regarding evaluating-positions for evaluating the configuration of the lens system in accordance with at least one of object and image position data, and arranging lenses within the lens system based on the generated lens system configuration data, the defined arrangement of the plurality of blocks, and the generated data regarding the evaluating-positions.

According to still another aspect, the present invention relates to a method for processing information regarding a lens system, the method comprising generating lens system configuration data regarding the configuration of lenses within the lens system in accordance with input lens system data, designating a reference lens from the lenses within the lens system in accordance with the lens system configuration data generated in the generating step, defining, in accordance with block composition data, a block comprising the reference lens designated by the designating step, and dependent lenses, which are not designated in the designating step, determining the position of the reference lens within the lens block defined in the defining step, and arranging the dependent lenses relative to the reference lens arranged in the arranging step, in accordance with the lens block defined in the defining step.

With the arrangements described above, data of an optical subsystem and data of a lens configuration forming the optical subsystem are input, and, from these data, data of the optical lens system required for optical evaluation is generated, whereby an optical lens system, such as a zoom lens system, can be easily defined on an optical CAD system according to an actual development approach of a lens system.

Optical elements of an optical system are grouped into hierarchy groups, and locations are defined separately for respective hierarchy groups.

BRIEF DESCRIPTION OF THE DRAWINGS

FIG. 16 is a schematic diagram showing an optical lens system of embodiment 2;

FIG. 24 is a schematic diagram showing an optical lens system of embodiment 3;

FIG. 36 is a schematic diagram illustrating a decentering system;

DESCRIPTION OF THE PREFERRED EMBODIMENTS

Referring to the figures, one embodiment, in accordance with the present invention, will be described in detail below.

Figure 1:
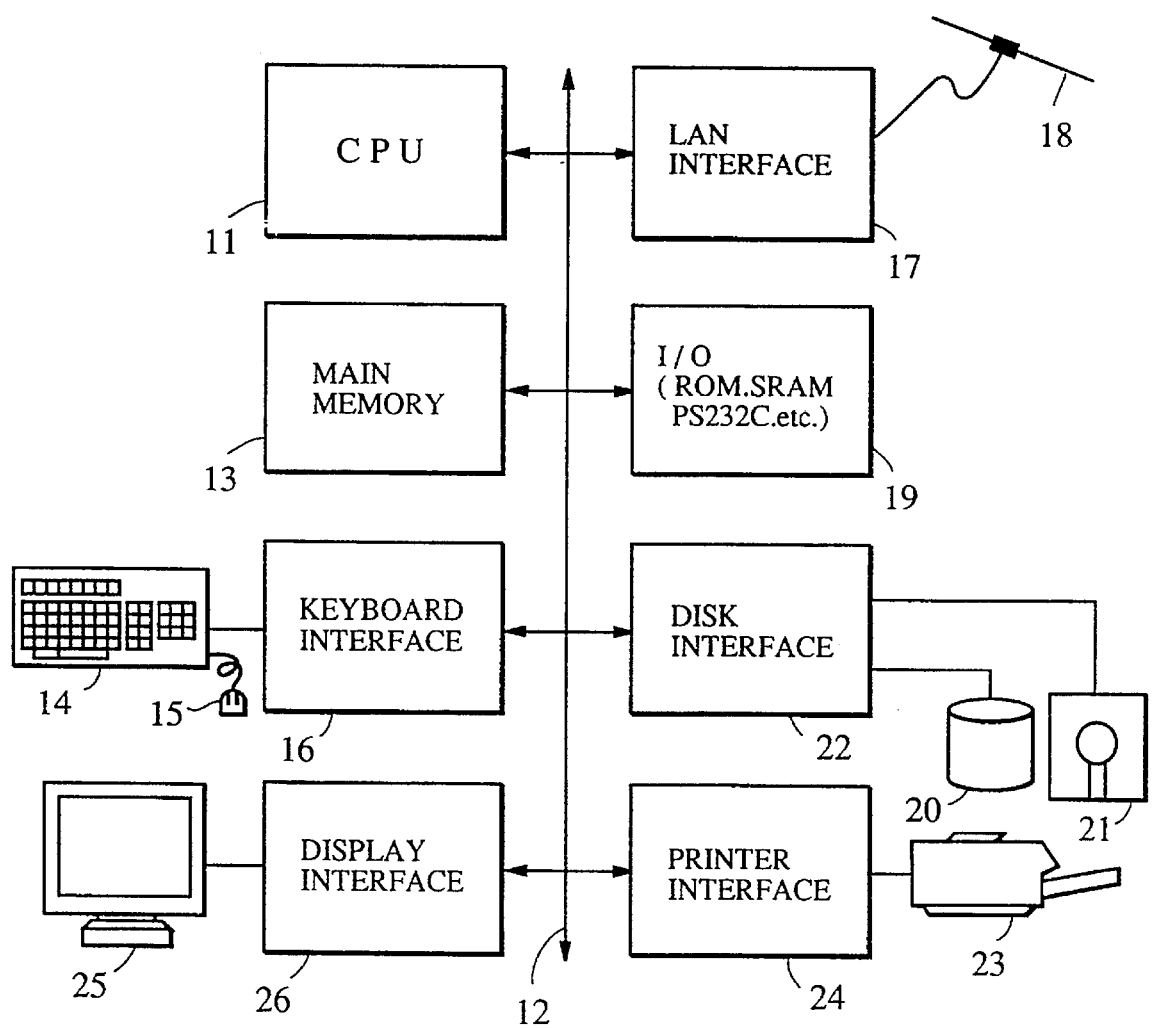
FIG. 1 is a block diagram showing an embodiment in accordance with the present invention.

FIG. 1 is a schematic diagram illustrating an information processing system in accordance with one embodiment of the present invention.

In this Figure, there are shown a CPU (central processing unit) 11 which controls the total system; a main memory 13 including ROM (read only memory) and RAM (random access memory) wherein the ROM stores a program that is executed by the CPU 11 and the RAM is used as a work area when the program is executed; keyboard 14 for inputting character information, including various kinds of character and also for inputting control information; a mouse 15 used as a pointing device; a keyboard interface 16 for communication from the keyboard 14 and the mouse 15 to the information processing system. There are also shown a LAN (local are network) interface 17 for connecting the information processing system to an LAN 18; an input/output device 19 (I/O device) including a ROM, an SRAM, and an RS232C-type interface to which various kinds of external devices may be connected; a hard disk device 20 and a floppy disk device 21 used as an external storage device; a disk interface 22 for communication between the information processing system and the hard disk device 20 or the floppy disk device 21; a printer 23 such as an ink jet printer or a laser beam printer; a printer interface 24 for communication between the printer 23 and the information processing system; a display 25 for displaying various information; a display interface 26 for communication between the display 25 and the information processing system; a system bus 12 comprising a data bus, a control bus and an address bus, for communication between the respective devices described above.

In the information processing system comprising the devices described above, a user may generally perform an operation interactively in response to information of various forms displayed on the display 25. That is, the display 25 displays various information on its screen in the form of a character or an image provided by external devices connected via the LAN 18 or I/O device 19, the keyboard 14, the mouse 15, or the hard disk device 20, and the display 25 also displays operation information associated with the user's operation wherein the operation information is stored in the main memory 13. Watching the information displayed on this screen, the user may edit information or may give instructions to the information processing system.

Embodiment 1

Figure 2:
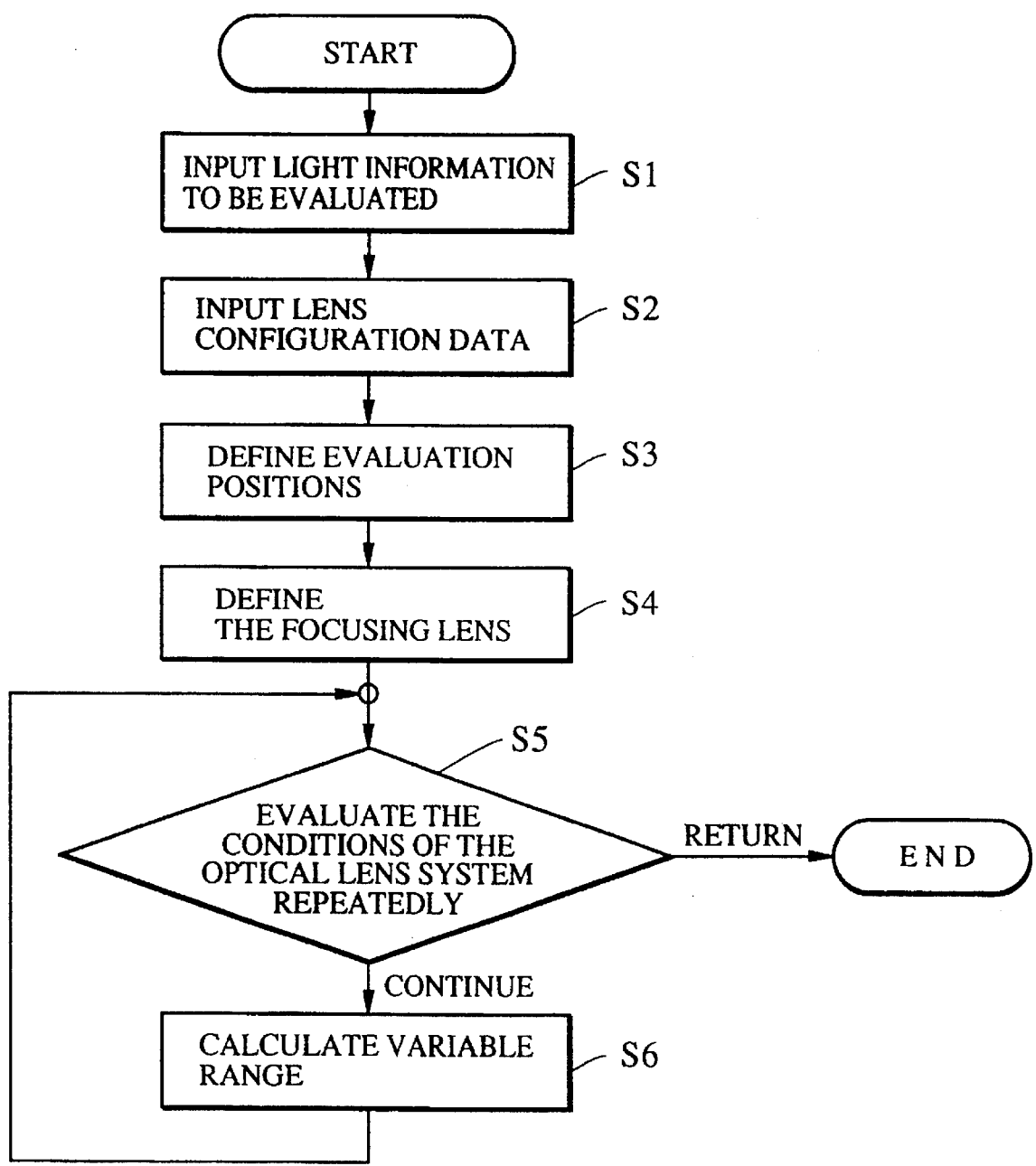
FIG. 2 is a flow chart which shows processing steps of embodiment 1, in accordance with the present invention.

FIG. 2 is a flow chart illustrating the processing steps of embodiment 1, in accordance with the present invention.

First, evaluating-light information such as the wavelength of the evaluating light and the angle of view is input via the keyboard 14 (step 1).

Then, data regarding the lens configuration such as the radius of curvature, distance between faces, lens material, and the diameter and position of a diaphragm, with respect to each lens comprising an optical lens system, is input via the keyboard 14 (step 2).

The evaluating positions such as the position of an object and the evaluating position of the image are input via the keyboard 14 (step 3). In this step, a plurality of positions of the object may be defined for the same focal length of the optical lens system.

In step 4, for the optical lens system having the same conditions and the focal length input in step 3, the lens that is used for focusing in the lens system defined in step 2 is defined by inputting information via the keyboard 14.

Referring to FIGS. 7–11, examples of inputting data in steps 1–3 will be described next.

Figure 7:
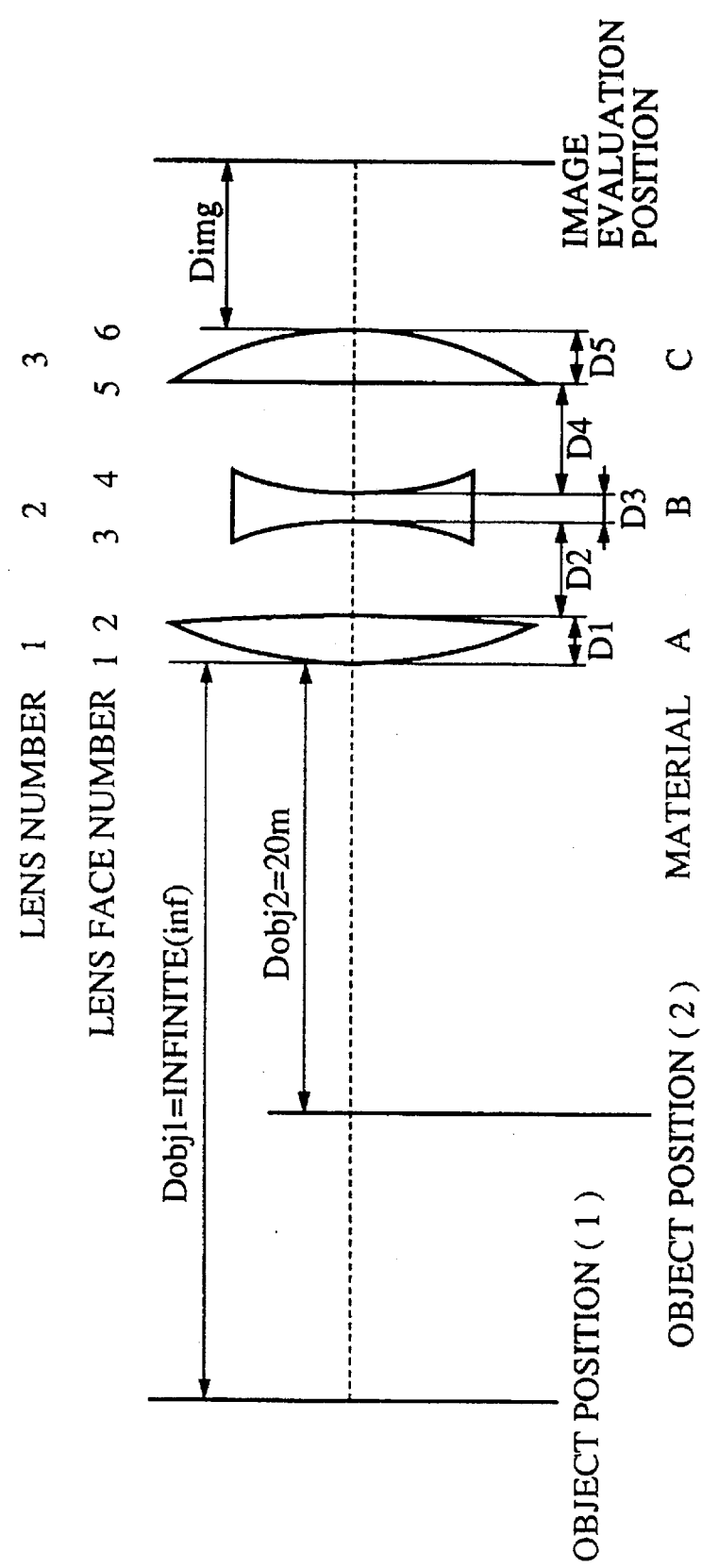
FIG. 7 is a schematic diagram showing an optical lens system of embodiment 1.
Figure 8:
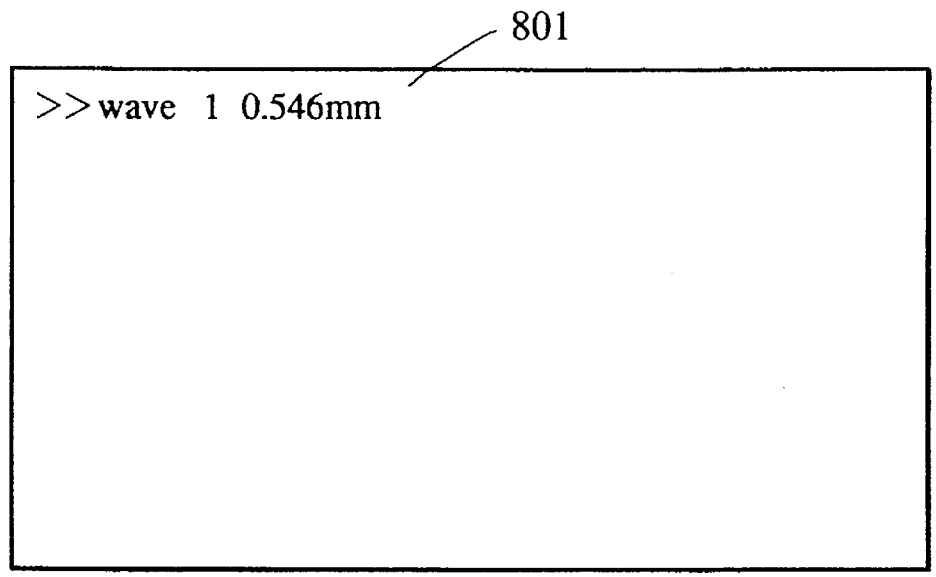
FIG. 8 is a schematic diagram showing an input display of embodiment 1.

When an optical lens system shown in FIG. 7 is defined, the evaluating light information is input in step 1 in such a way that for example the wavelength of the evaluating light is input with the aid of an input command as shown in FIG. 8. In FIG. 8, "wave" denotes a command used to define the wavelength, and "1" denotes the number of light rays, and "0.546 mm" denotes the wavelength.

Figure 9:
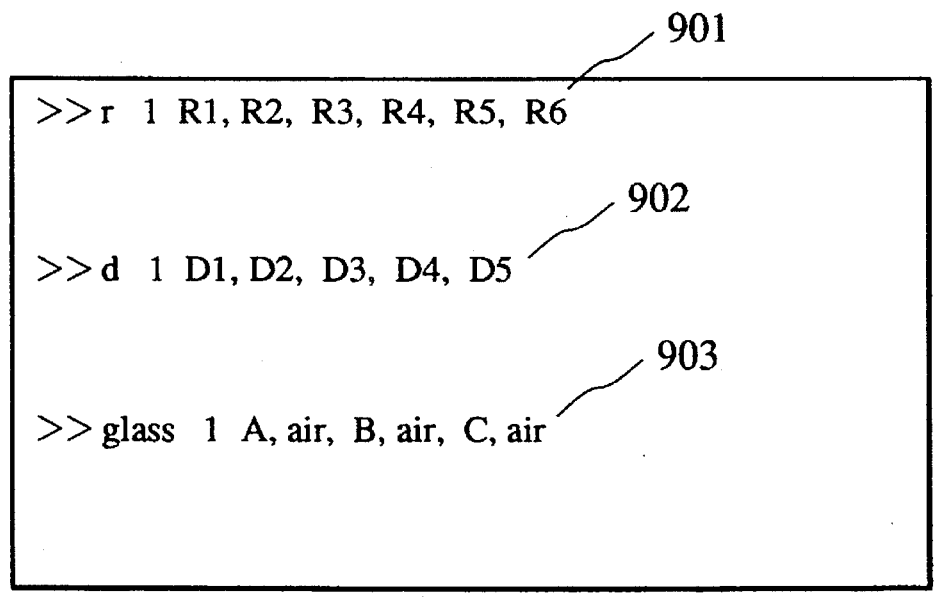
FIG. 9 is a schematic diagram showing an input display of embodiment 1.

Then, in step 2, as shown in FIG. 9, the configuration data of the lenses comprising the optical system, such as the radius of curvature, distance between faces, lens material, and lens diameter, are input with the aid of input commands.

In this figure, Reference numeral 901 denotes input information with respect to the curvature of each lens, wherein "r" denotes a command used to define the curvature, "1" denotes the starting lens face to which the curvature is to be defined, and "R1, . . . , R6" denotes the curvature of each lens face. Reference numeral 902 denotes input information representing the distances between lens faces, wherein "d" denotes a command used to input distances, "1" denotes the starting lens face to which the distance is to be determined, and "D1, . . . , D5" denotes the distances between the respective lenses. Reference numeral 903 denotes input information with respect to materials, wherein "glass" denotes a command used to define materials, "1" denotes a starting lens face to which the material is to be defined, and "A, . . . , air" denotes the materials.

Figure 10:
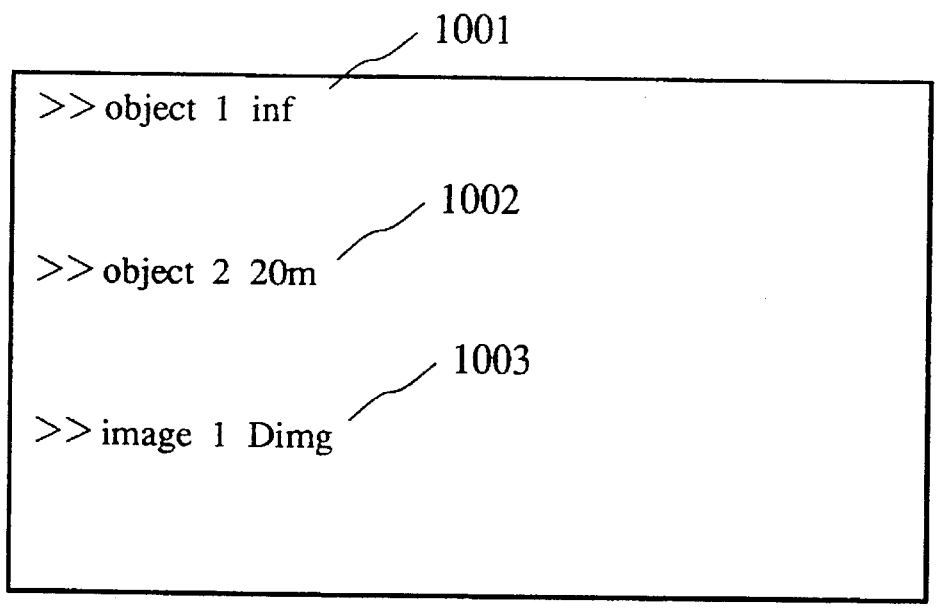
FIG. 10 is a schematic diagram showing an input display of embodiment 1.

Then, in step 3, as shown in FIG. 10, the evaluating positions such as the position of an object and the evaluating position of the image are input with the aid of commands. In this example, two positions are defined for the object, i.e., one is an infinite distance and the other one is a distance of 20 m from the face 1.

In FIG. 10, "1001" and "1002" denote the information with respect to the position of an object, wherein "object" denotes the command used to input the position of an object, and "1" and "2" denote the position number of the object to which the information is to be defined, and "inf" and "20m" denote the infinite distance and a distance of 20 m, respectively. Reference numeral 1003 denotes the information with respect to the evaluating positions, wherein "image" denotes the command used to define the evaluating positions, "1" denotes the evaluating-position number, and "Dimg" denotes the evaluating position associated with the image to be evaluated.

Figure 11:
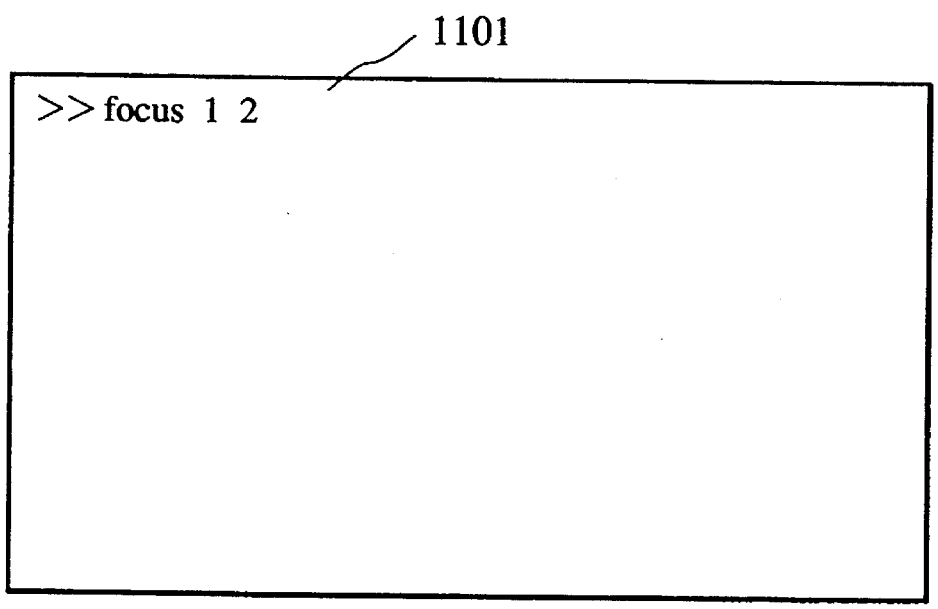
FIG. 11 is a schematic diagram showing an input display of the embodiment 1.

In step 4, as shown in FIG. 11, the lens of the lens system defined in step 2 that is used for focusing is defined with the aid of the input command. In FIG. 11, "1101" denotes the information with respect to focusing, wherein "focus" denotes the command used to define focusing lenses, and "1" and "2" denote the lens faces of the focusing lens.

In this example, the lens used for focusing is specified by the lens face number of the lens within the lens system. However, the focusing lens may also be specified by the lens itself.

Furthermore, in this example, one lens is specified as the focusing lens. However, a plurality of lenses may also be specified as the focusing lenses.

In this example, it has been described that each definition is carried out with the aid of input commands. However, definition may also be carried out by another method such as screen editing.

The values which have been input via the keyboard 14 in steps 1–4 are stored in the main memory 13.

Then, in step 5 of FIG. 2, the position information with respect to the object stored in the main memory 13 is read out, and the next step 6 will be performed repeatedly depending on the definition of the object position. When it is determined that the conditions of the optical lens systems, corresponding to the number of the positions of an object, have been generated, the loop will be completed.

In step 6, the information stored in the main memory 13 representing which lens of the lens configuration of the optical lens system, which was defined in step 2 for the same focal length, is used as the focusing lens is read out. Then, the CPU 11 calculates the amount of change in distance between lenses along the optical axis that is required to achieve the conjugate position of the object position defined in the present loop so that it may coincide with the evaluating position of the image. In this way, condition data, with respect to the optical system for use in optical evaluation, is generated and stored in the main memory 13.

Figure 12:
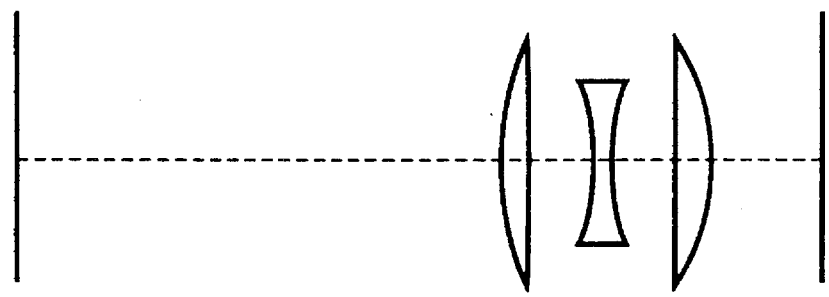
FIG. 12 is a schematic diagram showing an optical lens system of embodiment 1.
Figure 13:
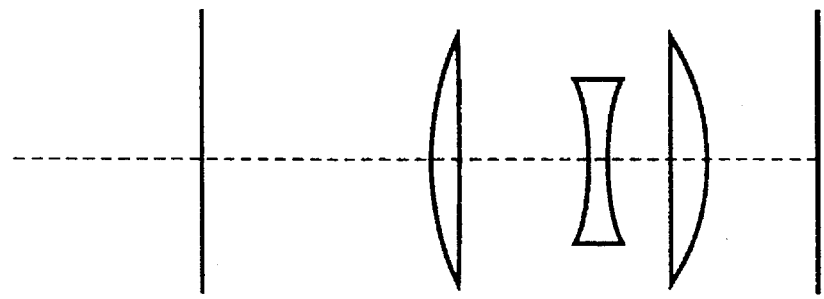
FIG. 13 is a schematic diagram showing an optical lens system of embodiment 1.

In step 6, conditions of the optical system are generated which are in-phase conditions for two respective object positions defined, i.e., infinite distance and the distance of 20 m from the lens face 1. Thus, two conditions are generated: in one condition of the optical system shown in FIG. 12, the infinite distance is in focus, and in the other condition shown in FIG. 13, the position of the object 20 m forward of the lens face 1 is in focus.

In the examples shown in FIGS. 7–13, the conditions are generated according to the feature of embodiment 1, by changing the distance between lens face 2 and lens face 3, depending on the object position.

Alternatively, an instruction may be given in step 4 to indicate whether focusing with respect to the position of the object has been carried out to generate the condition data of the optical lens system. Furthermore, in step 6, the condition data associated with the optical system for use in optical evaluation may be generated either as condition data in which focusing is carried out with respect to the object position or as condition data in which no focusing is carried out for the same focal length condition of the optical system according to the instruction given in step 4 which indicates the generation of the condition data of the optical lens system, by separately setting the focal length condition of the optical lens system and the condition data of the optical lens system in which focusing is performed with respect to the position of the object.

In this embodiment, the step (not shown in the figures) in which an optical evaluation is carried out, based on the condition data generated in step 6 with respect to the optical system read out from the main memory 13, may be located just after step 6, or it may be located at the location after returning from step 5, whereby an optical evaluation is carried out according to the defined evaluation-light information.

With the optical CAD system, the design of a lens system is accomplished according to the following procedure. First, data associated with the optical lens system is defined on the optical CAD system, and the target values to be satisfied such as aberration are defined. Then, the configuration data of the lens is specified as variables, and the optical evaluation is performed. The variables are modified to satisfy the given target values. Thus, optimization is carried out for the optical lens system.

In this case, the data of the lens configuration that is specified as variables is modified and condition data of the optical system for use in the optical evaluation are generated in step 6.

It has been described that processing steps are executed in the order of step 1, then step 2, then step 3, and finally step 4. However, these steps may be executed in an arbitrary order as long as these steps are executed before step 5 in which the decision is made as to whether the generation of the condition data of the optical system should be further repeated.

Furthermore, step 1, step 2, step 3, and step 4 may be grouped into one step, or, any two of these steps may be grouped into one step, or otherwise, any three of these steps may be grouped into one step.

Embodiment 2

Now, referring to the figures, embodiment 2 in accordance with the present invention, will be described in detail below.

Figure 3:
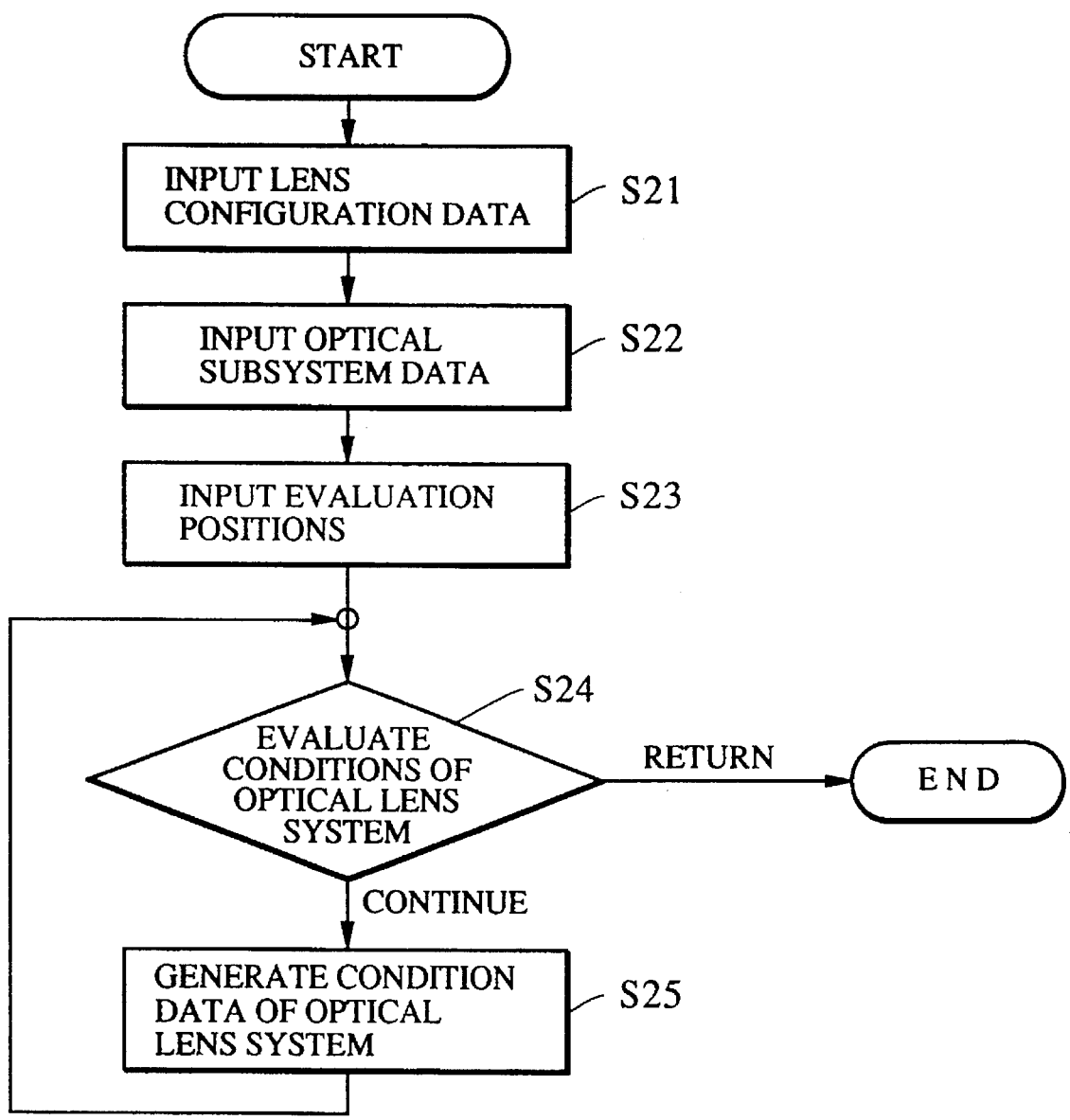
FIG. 3 is a flow chart which shows processing steps of embodiment 2, in accordance with the present invention.

FIG. 3 is a flow chart illustrating the processing steps in accordance with embodiment 2 of the present invention.

First, data of the lens configuration such as the radius of curvature, the distance between faces, the lens material, and the position of the diaphragm are input via the keyboard 14, with respect to each lens comprising the optical subsystems in the optical lens system (step 21).

Then, the distances between the optical subsystems are input via the keyboard 14 (step 22). The optical lens system to be defined is considered to include one or more optical subsystems and the distances between the subsystems are input. In the optical path from the object position, the optical subsystem that is the nearest to the evaluating position of the image, i.e., the final optical subsystem, does not have a next neighboring optical subsystem, and thus it may be used to define an image evaluating plane or the inputting of the distance between subsystems may be neglected, or otherwise a certain value is set and it will be neglected in a later step 25.

For example, if the optical lens system consists of two optical subsystems, the distance between the optical subsystems can be defined as the distance from the first optical subsystem and to the second subsystem, wherein the order of the first and the second subsystem is defined by the order of transmission of light.

For each distance between optical subsystems, a plurality of values may be defined. In the previous example in which the optical system comprises two subsystems, this means that it is possible to define a plurality of distances between the first optical subsystem and the second optical subsystem.

Then, evaluation positions such as the position of the object, the evaluating position of the image, the angle of view, and the evaluating wavelength are input via the keyboard 14 (step 23).

Referring to FIGS. 14–21, examples of inputting data in steps 21–23 will be described next.

Figure 14:
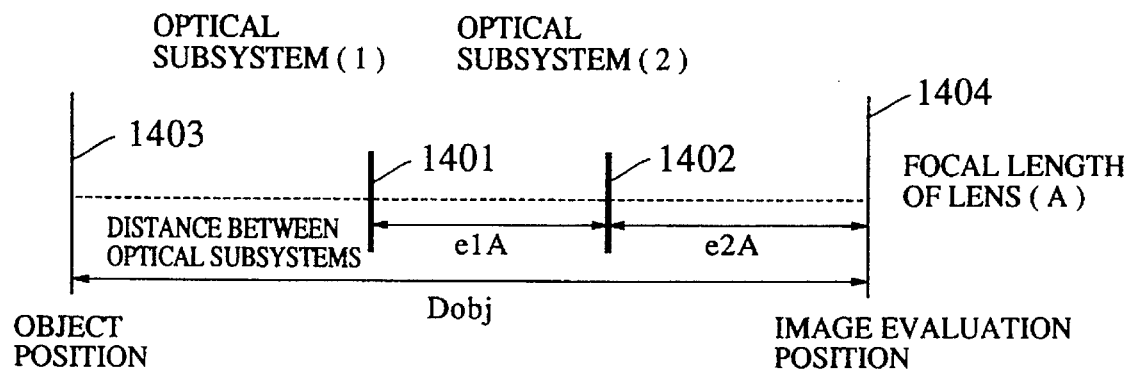
FIG. 14 is a schematic diagram showing an optical lens system of embodiment 2.
Figure 15:
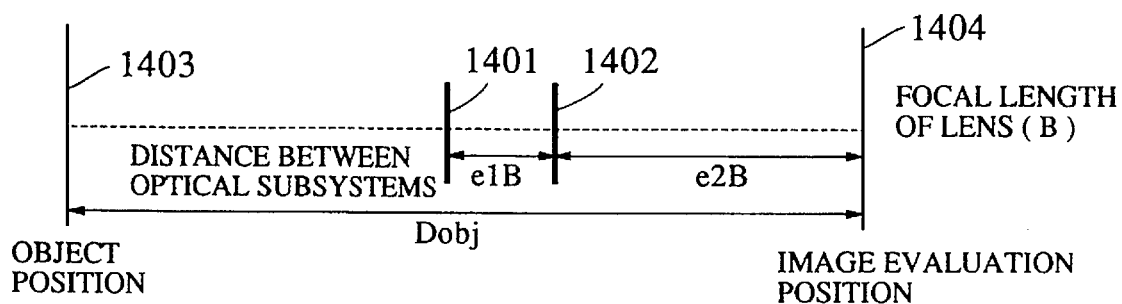
FIG. 15 is a schematic diagram showing an optical lens system of embodiment 2.

FIGS. 14 and 15 show distances between an optical subsystem (1) 1401 and an optical subsystem (2) 1402 with a focal length of A (FIG. 14) and B (FIG. 15), respectively. FIG. 16 is a more detailed schematic diagram of the optical subsystem (1) 1401 and (2) 1402, which shows the relationship between the lens face numbers 1–17 and the distances D1–D16 between the lens faces.

An optical zoom lens system shown in FIGS. 14–16 may be defined as follows. In step 21, as shown in FIG. 17, the configuration data of the lenses comprising the optical system, such as the radius of curvature, distance between the faces, the lens material, and the lens diameter, are input with the aid of input commands.

Figure 17:
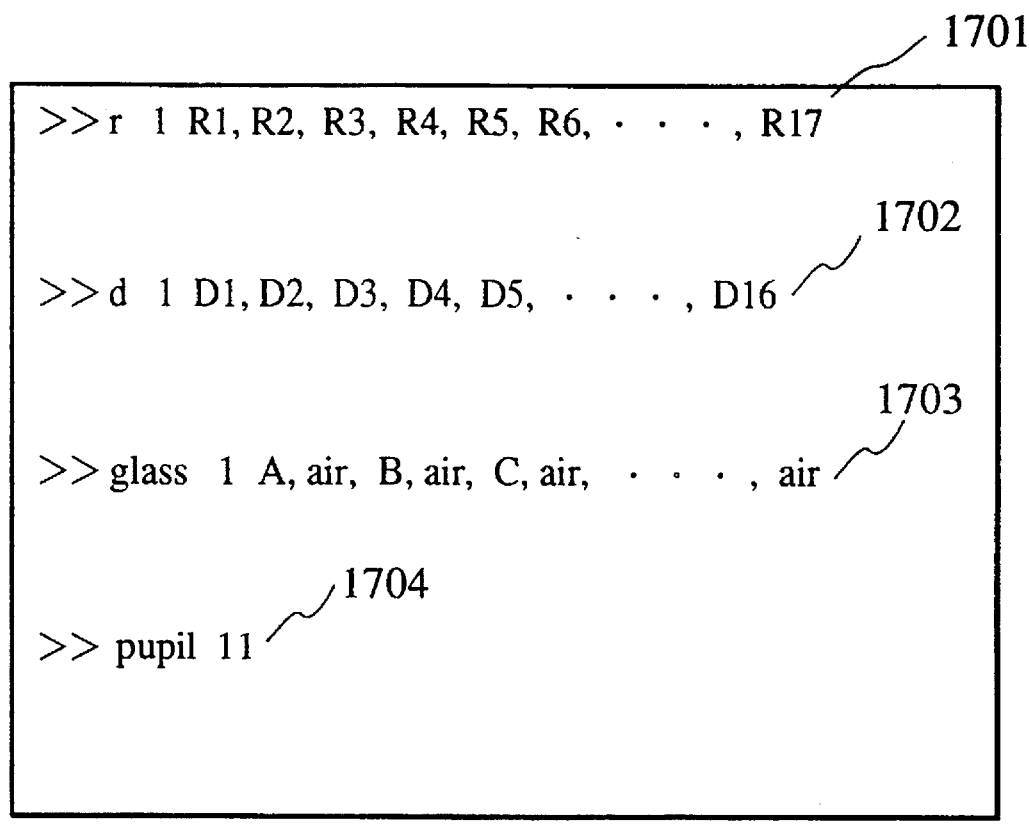
FIG. 17 is a schematic diagram showing an input display of embodiment 2.

In FIG. 17, which shows an example displayed on the display 25, "1701" denotes input information with respect to the curvature of each lens, wherein "r" denotes a command used to define the curvature, "1" denotes the starting lens face to which the curvature is to be defined, and "R1, . . . , R17" denote the curvature of each lens face. Reference numeral 1702 denotes input information representing the distances between faces, wherein "d" denotes the command used to input distances, "1", denotes the starting lens face to which the distance is to be defined, and "D1, . . . , D16" denote distances between respective lenses. Reference numeral 1703 denotes input information with respect to materials, wherein "glass" denotes the command used to define materials, "1" denotes the starting lens face to which the material is to be defined, "A, . . . , air" denote the materials. Reference numeral 1074 denotes input information with respect to pupils, wherein "11" denotes the lens number whose pupil is to be defined.

Figure 18:
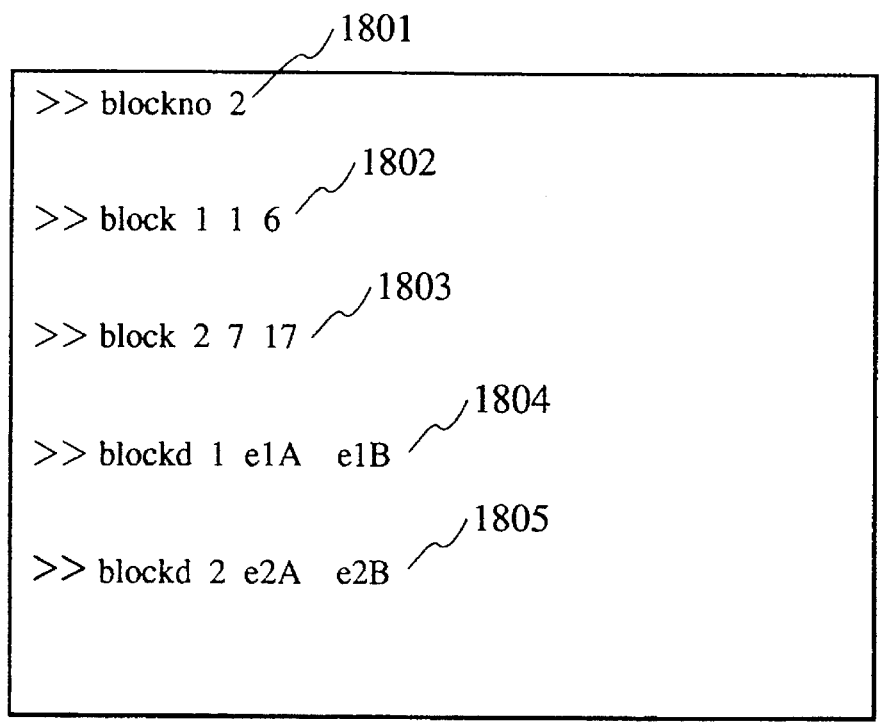
FIG. 18 is a schematic diagram showing an input display of embodiment 2.

In step 22, as shown in FIG. 18, component lenses and distances between optical subsystems are input with the aid of an input command for each optical subsystem comprising the optical system.

In FIG. 18, which shows an example displayed on the display 25, "1801" denotes input information with respect to the number of optical subsystems, wherein "blockno" denotes the command used to input the number of optical subsystems and "2" denotes the number of optical subsystems to be defined. Reference numerals 1802 and 1803 denote input information with respect to the configuration of the optical subsystems, wherein "block" denotes the command used to define the configuration of optical subsystems, the first "1" of "1802" denotes the optical subsystem number to be defined, and the next "1" denotes the starting lens face number comprising the optical subsystem, and "6" denotes the end lens face number. Reference numeral "1803" is similar to "1802". Further, reference numeral 1804 and 1805 denote input information with respect to the distances between optical subsystems, wherein "1" of "1804" denotes the optical subsystem number whose distance is to be defined, "e1A" and "e1B" denote the distances between optical subsystems for the focal lengths A and B, respectively. Reference numeral 1805 denotes similar input information to that of 1804.

In this example, the distances between respective optical subsystems, which have been given when the power arrangement for the optical system is determined, are redefined, when the more specific configuration is defined, as the distance between the image-side principal point of a certain optical subsystem and the object-side principal point of its next neighboring optical subsystem.

In this step, there may be provided a command to define an input mode in which the distances between the optical subsystems are input so that the distances between optical subsystems may be defined in various manners such as the distance from an arbitrary lens in a certain optical subsystem to an arbitrary lens in its next neighboring optical subsystem, or the distance from the object-side principal point to the image-side or object-side principal of the next neighboring optical subsystem.

Figure 19:
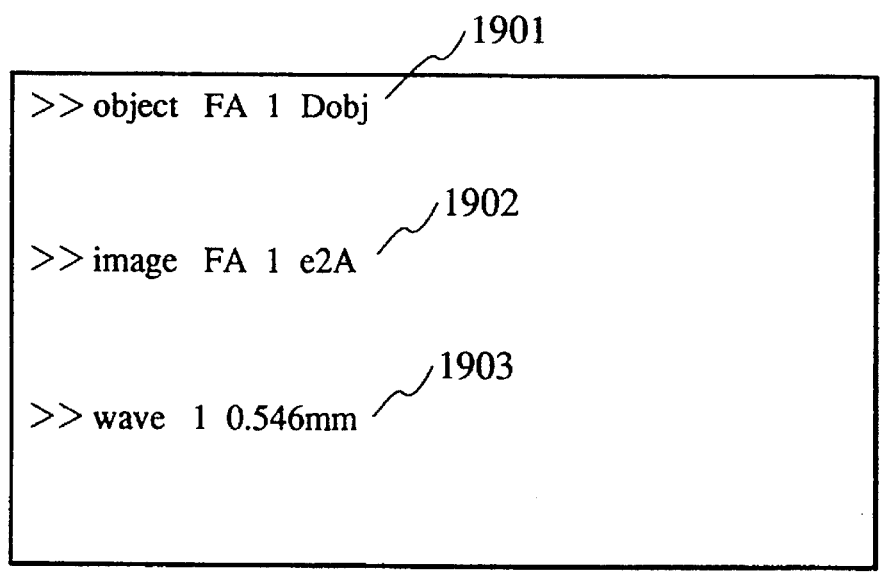
FIG. 19 is a schematic diagram showing an input display of embodiment 2.

In step 23, as shown in FIG. 19, the evaluating positions such as the wavelength of the evaluating light, the position of an object, and the evaluating position of the image are input with the aid of commands.

In FIG. 19, which shows an example displayed on the display 25, reference numeral 1901 denotes input information with respect to the position of an object, wherein "object" denotes the command used to input the position of an object, "FA" denotes the information specifying the focal length condition of the lens with respect to the object position, "1" denotes the position number specifying the object to be defined, and "Dobj" denotes the information specifying the position of the object to be defined. Similarly, required information may also by given for the lens focal length B. Reference numeral 1902 denotes the information with respect to the evaluating positions, wherein "image" denotes the command used to define the evaluating positions, "FA" denotes the information specifying the focal length condition of the lens with respect to the object position, "1" denotes the evaluating-position number of the image, and "e2A" denotes the evaluating position associated with the image to be defined. Similarly, required information may also by given for the lens focal length B. Reference numeral 1903 denotes the input information with respect to wavelength, wherein "wave" denotes the command used to define the wavelength, and "1" denotes the number of light rays, and "0.546 mm" denotes the wavelength.

In the examples shown in FIGS. 17–19, it has been described that each input information is given with the aid of input commands. However, the information may also be given by another method such as screen editing.

The values which have been input via the keyboard 14 in each step are stored in the main memory 13.

Then, in step 24, from the values of the distances between the optical subsystems stored in the main memory 13, the decision is made as to whether the condition data of the optical lens system should be generated. This decision may be made for example in terms of the distance between optical subsystems, and the generation of condition data with respect to the optical system may be controlled based on the condition of the optical subsystem to which the largest number of distances between the optical subsystems are defined. Alternatively, there may be provided before step 24 a step (not shown) for defining the number of conditions of the optical lens system to be generated, and this number may be stored in the main memory 13 so that the number may be read out from the main memory 13 in step 24 and the loop for generating the condition data with respect to the optical system is executed the same number of times as the number of desired conditions.

If a continuation of the loop generating the condition data of the optical system is decided upon in step 24, then step 25 is executed.

In step 25, the values that were defined in steps 21–23 and which were stored in the main memory 13 are read out and the condition data of the optical lens system, for use in the optical evaluation, is generated and stored in the main memory 13.

From the data of the lens configuration, the data representing the shape of the lens is defined for each optical subsystem, and the obtained data of the shape of the lenses is allocated according to the data with respect to the optical subsystem. Then, the condition data of the optical subsystem for use in the optical evaluation is generated. As a matter of course, the generation of the data may be performed in reverse order.

With the optical CAD system, the design of the lens system is accomplished according to the following procedure. First, data associated with the optical lens system is defined on the optical CAD system, and the target values to be satisfied such as aberration are defined. Then, the configuration data of the lens is specified as variables and the optical evaluation is performed. The variables are modified to satisfy the given target values. Thus, optimization is carried out for the optical lens system.

In this case, the data of the lens configuration which are specified as variables are modified and the condition data of the optical system, for use in optical evaluation, are generated in step 25.

Figure 20:
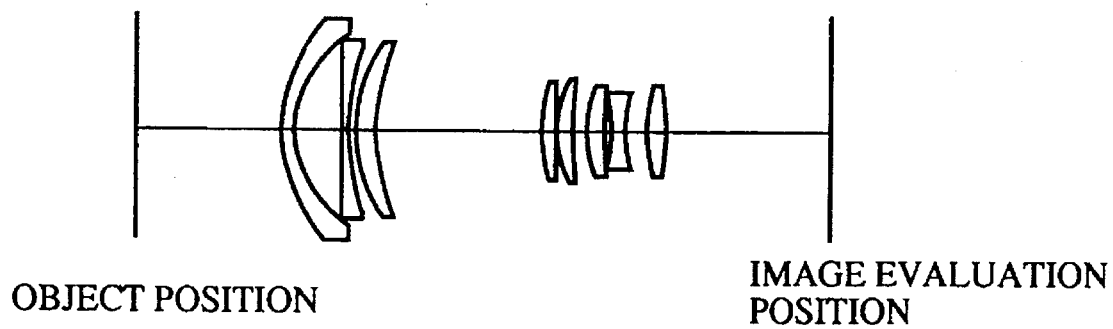
FIG. 20 is a schematic diagram showing an optical lens system of embodiment 2.
Figure 21:
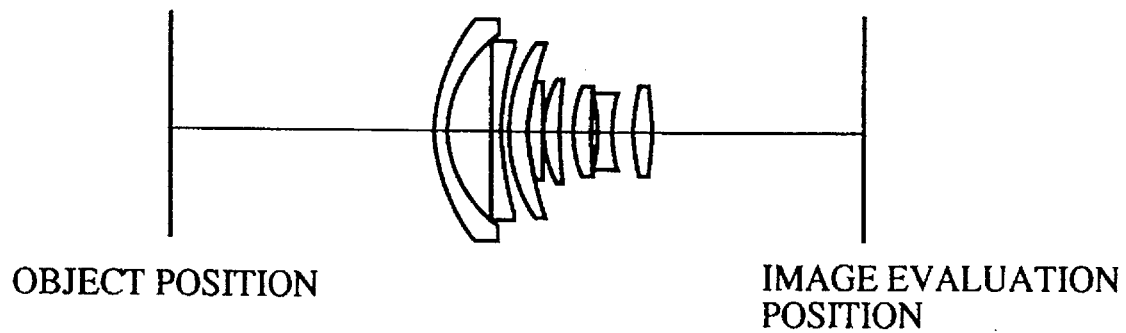
FIG. 21 is a schematic diagram showing an optical lens system of embodiment 2.

In step 25, condition data of an optical system having different distances between the optical subsystems are generated, as shown in FIGS. 20 and 21.

In this embodiment, the step (not shown in the figures) in which an optical evaluation is carried out, based on the condition data generated in step 25 with respect to the optical system read out from the main memory 13, may be located just after step 25 whereby an optical evaluation is carried out according to the evaluation-light information defined, or otherwise this step may be located at a location that is positioned after the returning point of the loop initiated from step 24.

It has been described that processing steps are executed in the order of step 21, then step 22, and finally step 23, as shown in FIG. 3. However, these steps may be executed in an arbitrary order as long as these steps are executed before step 24.

Alternatively, step 21, step 22, and step 23 may be grouped into one step, or, any two of these steps may be grouped into one step.

Alternatively, any of steps 21, 22, and 23 may be divided into arbitrary subfunctions.

Embodiment 3

Now, referring to the figures, embodiment 3, in accordance with the present invention, will be described in detail below.

Figure 4:
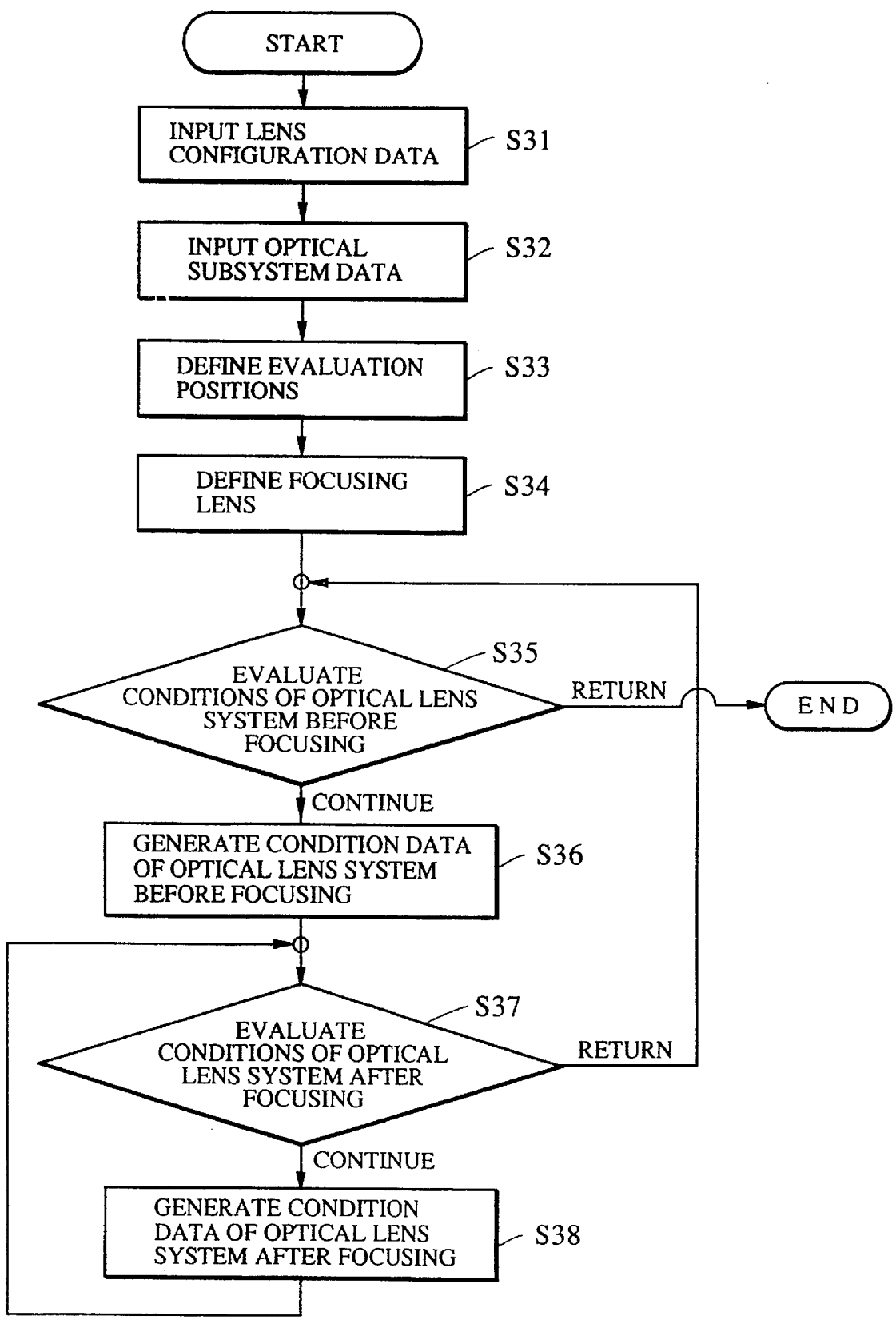
FIG. 4 is a flow chart which shows processing steps of embodiment 3, in accordance with the present invention.

FIG. 4 is a flow chart illustrating processing steps in accordance with embodiment 3 of the present invention.

First, data regarding the lens configuration such as the radius of curvature, the distance between lens faces, the lens material, and the position of the diaphragm are input via the keyboard 14, with respect to each lens comprising the optical subsystems in the optical lens system (step 31).

Then, considering the optical lens system to consist of one or more optical subsystems, the distances between the optical subsystems are input via the keyboard 14 (step 32).

Thus, the optical lens system to be defined is considered to include one or more optical subsystems and the distances between subsystems are input. In the optical path from the object position, the optical subsystem that is the nearest of these subsystems to the evaluating position of the image, i.e., the final optical subsystem, does not have a next neighboring optical subsystem, and thus it may be used to define an image evaluating plane, or the inputting of the distance between subsystems may be neglected, or otherwise a certain value is set and the value will be neglected in later step 36.

For example, if the optical lens system consists of two optical subsystems, the distance between the optical subsystems can be defined as the distance from the first optical subsystem to the second subsystem, wherein the order of the first and the second subsystem is defined by the order of transmission of light.

For each distance between optical subsystems, a plurality of values may be defined. In the previous example in which the optical system comprises two subsystems, this means that it is possible to define a plurality of distances between the first optical subsystem and the second optical subsystem.

Then, evaluation positions such as the position of the object, the evaluating position of the image, the angle of view, and the evaluating wavelength are input via the keyboard 14 (step 33). In this step, a plurality of positions of the object may be defined for the same lens focal length condition of the optical lens system.

Then, in step 34, for the same focal length condition of the optical lens system, the lens of the lens configuration data defined in step 31 that is used as a focusing lens is defined by inputting information via the keyboard 14.

Otherwise, the conditions with respect to the optical subsystems defined in step 32 may be used as the definition of the focusing lens.

In this case, all lenses comprising the optical subsystem are considered to be used for focusing, and the condition data will be calculated and defined in the following steps.

Figure 22:
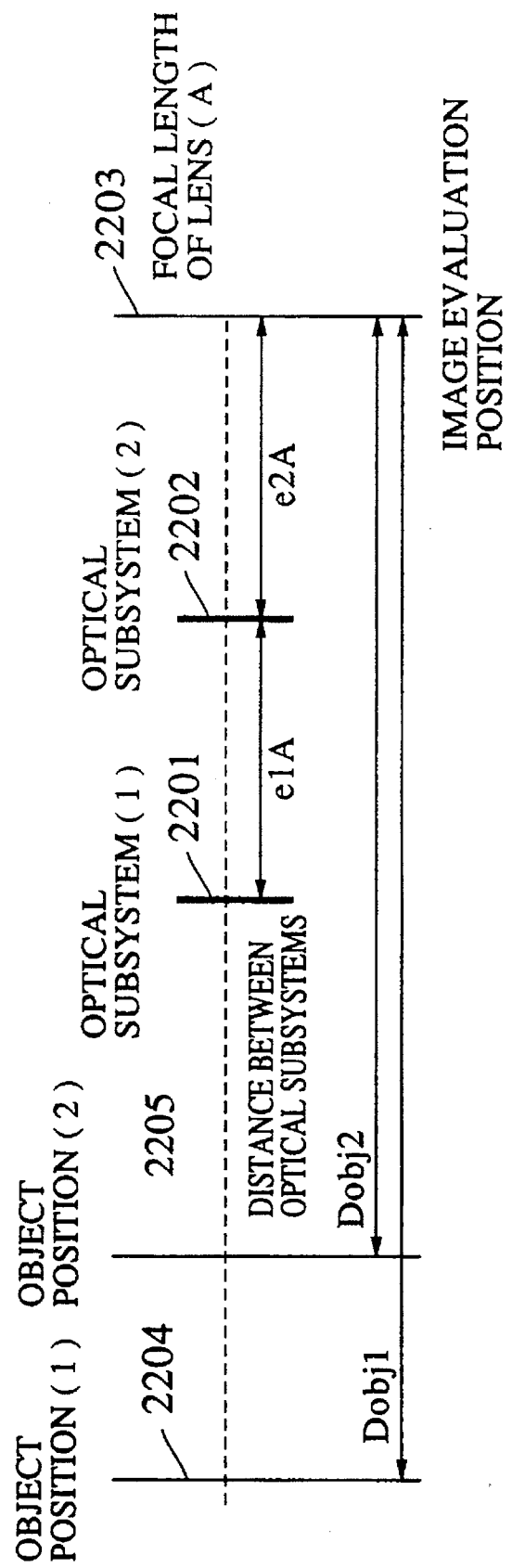
FIG. 22 is a schematic diagram showing an optical lens system of embodiment 3.
Figure 23:
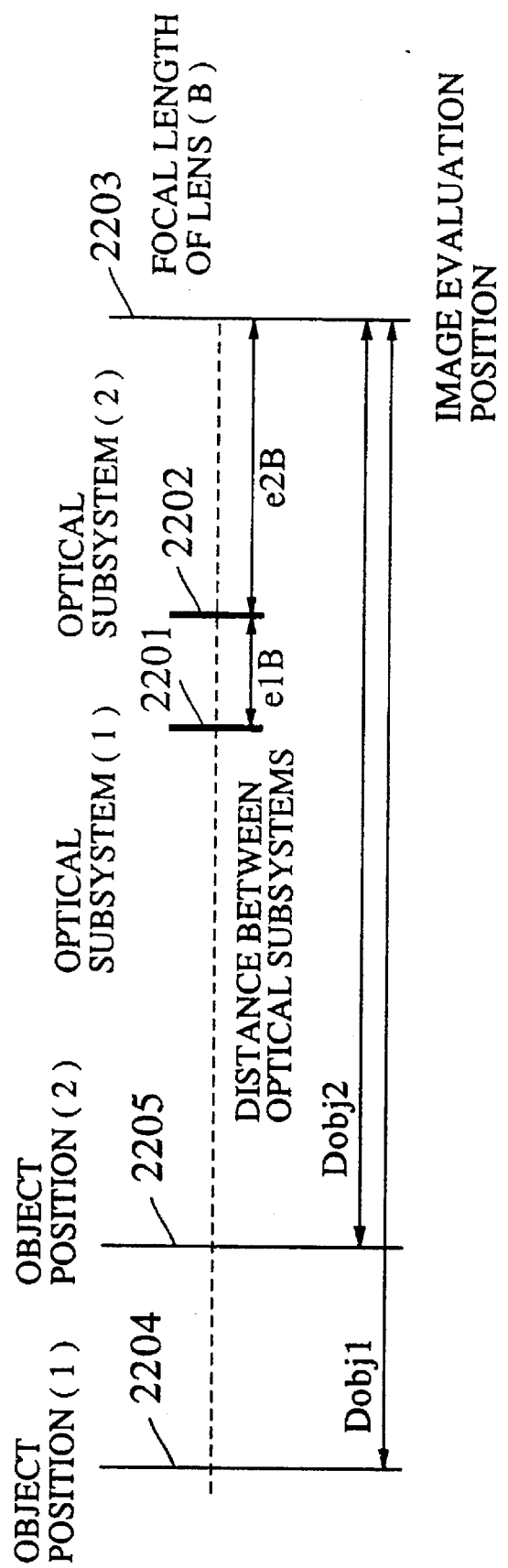
FIG. 23 is a schematic diagram showing an optical lens system of embodiment 3.

Referring to FIGS. 22–32, examples of inputting data in steps 31–34 will be described below. FIGS. 22 and 23 show the relationship between optical subsystems (1) 2201 and (2) 2202 for object positions (1) and (2) and for lens focal lengths A and B, respectively. FIG. 24 is a more detailed schematic diagram of the optical subsystems (1) 2201 and (2) 2202.

Figure 25:
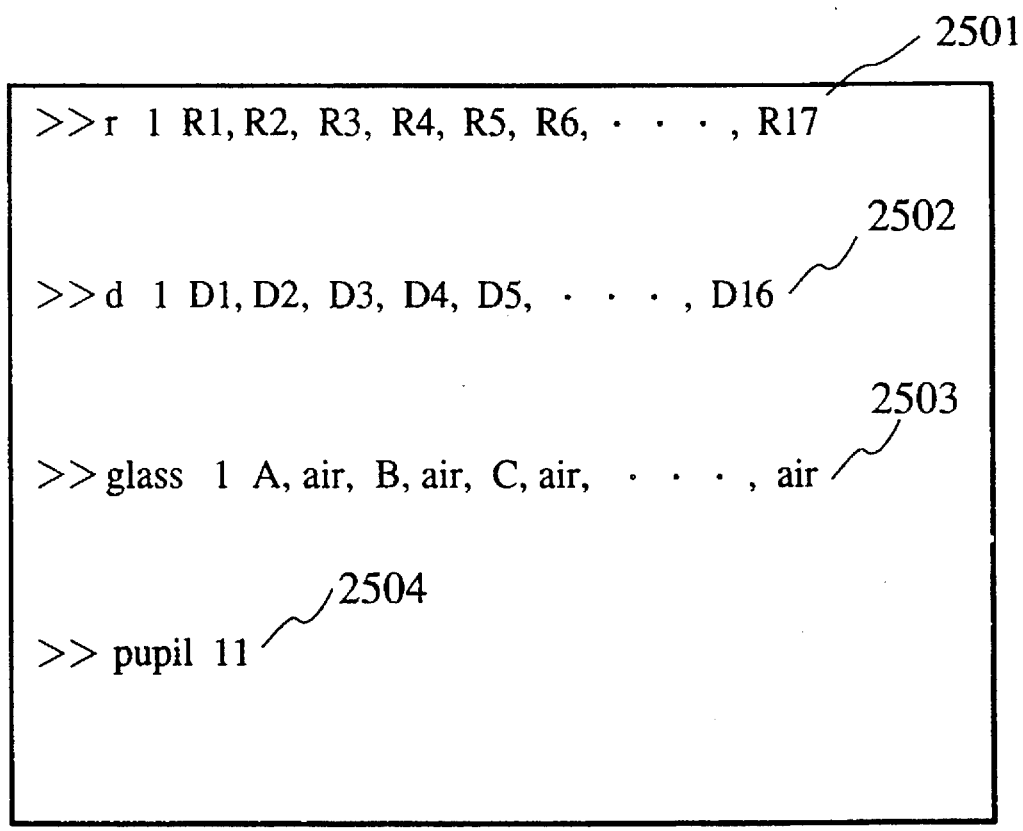
FIG. 25 is a schematic diagram showing an input display of embodiment 3.

An optical zoom lens system shown in FIGS. 22–24 may be defined as follows. In step 31 in FIG. 4, and as shown in FIG. 25, the configuration data of the lenses comprising the optical system, such as the radius of curvature, the distances between lens faces, the lens material, and the lens diameter, are input with the aid of input commands. FIG. 25 shows an example of a display on the display device 25, wherein 2501 through 2504 denote the commands or information similar to those denoted by 1701 through 1704 which were shown in FIG. 17.

Figure 26:
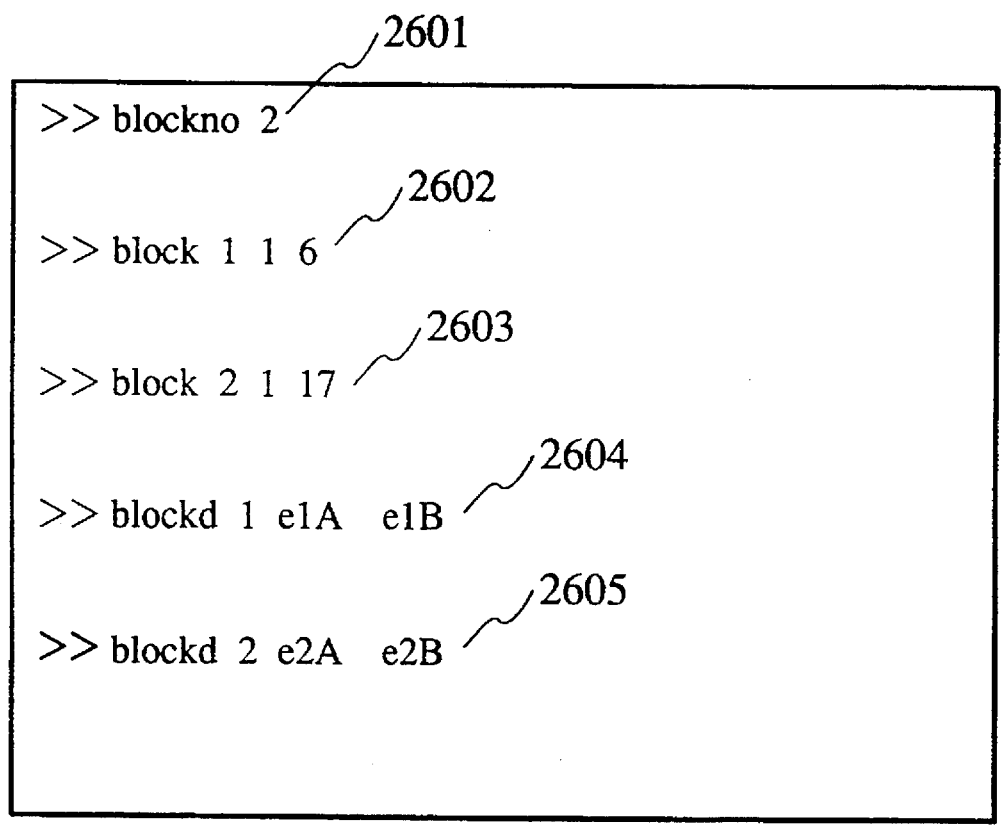
FIG. 26 is a schematic diagram showing an input display of embodiment 3.

In step 32, as shown in FIG. 26, data with respect to optical subsystems, such as the component lenses of each optical subsystem comprising the optical system and the distances between optical subsystems, are input with the aid of an input command. FIG. 26 shows an example of a display on the display device 25, wherein 2601 through 2605 denote the commands or information similar to those denoted by 1801 through 1805, which were shown in FIG. 18.

In this example, the distances between respective optical subsystems, which were given when the power arrangement for the optical system was determined, are re-defined, when a more specific configuration is defined, as the distance between the image-side principal point of a certain optical subsystem and the object-side principal point of its neighboring optical subsystem.

In this step, there may be provided a command to define the input mode in which the distances between the optical subsystems are input so that the distances between the optical subsystems may be defined in various manners such as the distance from an arbitrary lens in a certain optical subsystem to an arbitrary lens in a neighboring optical subsystem, or the distance from the object-side principal point to the image-side or object-side principal of the next neighboring optical subsystem.

Figure 27:
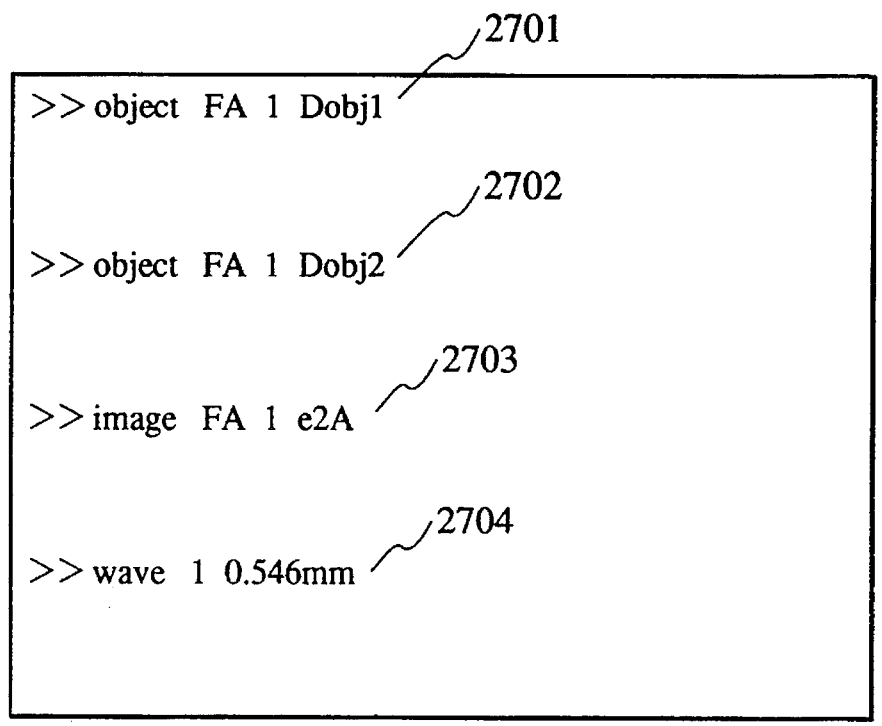
FIG. 27 is a schematic diagram showing an input display of embodiment 3.

In step 33, as shown in FIG. 19, the evaluating positions such as the wavelength of the evaluating light, the position of an object, and the evaluating position of the image are input with the aid of commands. FIG. 27 shows an example of a display on the display device 25, wherein 2701 and 2702 denote commands or information similar to those denoted by 1901, shown in FIG. 19, and 2703 and 2704 denote commands or information similar to those denoted by 1902 and 1903 shown in FIG. 19.

Figure 28:
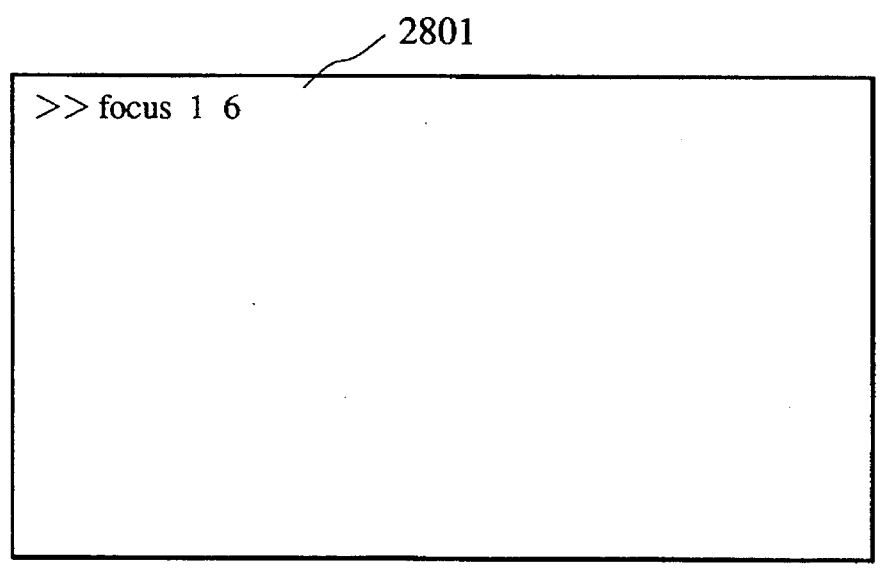
FIG. 28 is a schematic diagram showing an input display of embodiment 3.
Figure 29:
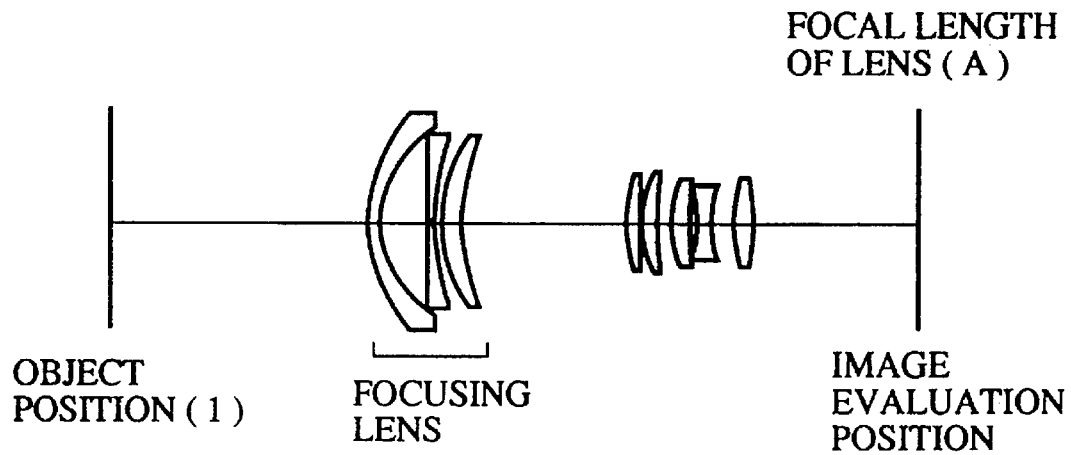
FIG. 29 is a schematic diagram showing an optical lens system of embodiment 3.
Figure 30:
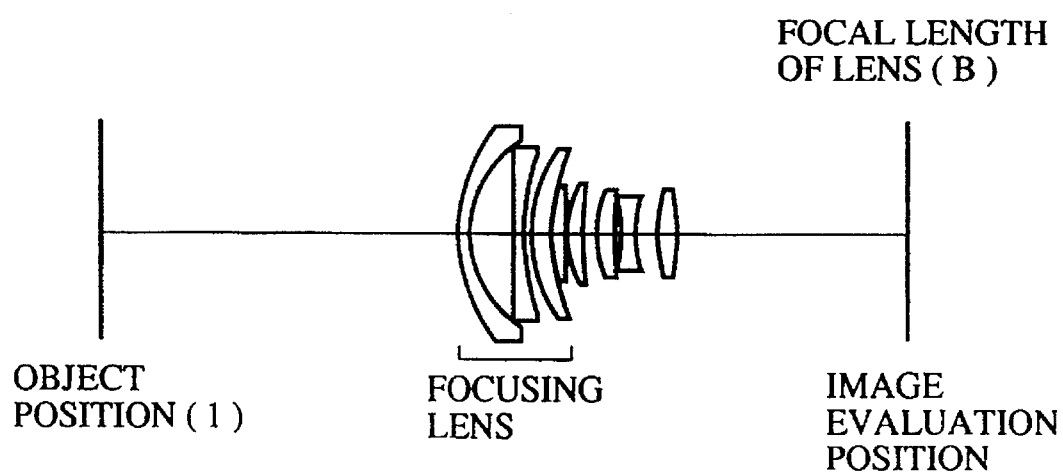
FIG. 30 is a schematic diagram showing an input display of embodiment 3.
Figure 31:
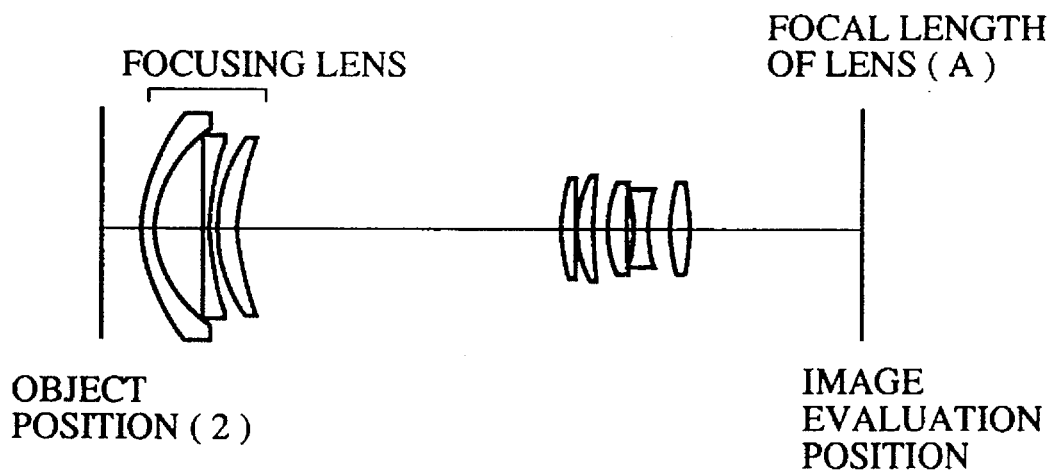
FIG. 31 is a schematic diagram showing an input display of embodiment 3.
Figure 32:
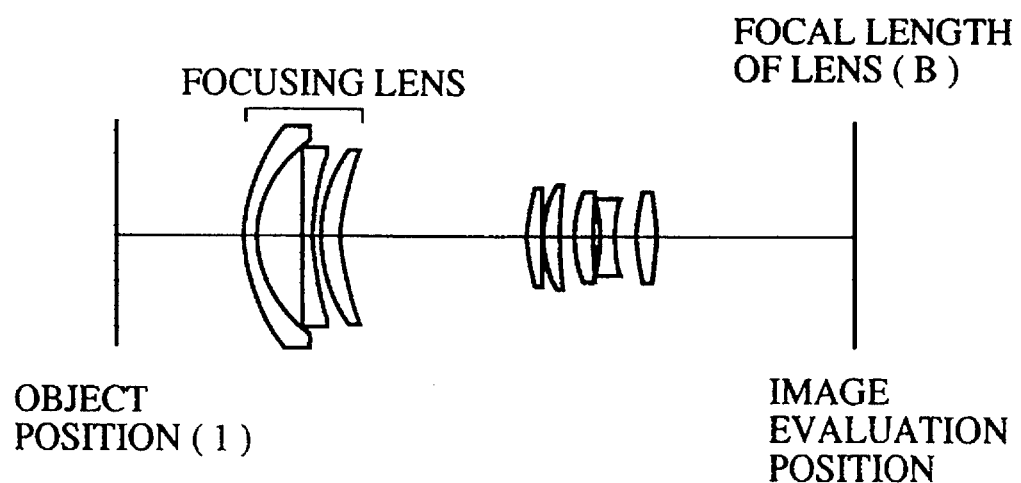
FIG. 32 is a schematic diagram showing an input display of embodiment 3.

In step 34, as shown in FIG. 28, the lens of the lens system defined in step 31 that is used for focusing is defined with the aid of an input command. FIG. 28 shows an example of a display on display device 25, wherein reference numeral 2801 denotes the information with respect a focusing lens, and wherein "focus" denotes the command used to define the focusing lenses, "1" denotes the starting lens face number of the lenses used for focusing, and "6" denotes the end lens face number of the lenses used for focusing.

In this example, the lens used for focusing is specified by the face number of the lens comprising the lens system. However, the focusing lens may also be specified by just the lens.

Alternatively, the lens used for focusing may be specified by the optical subsystem which was defined in step 32.

In this example, it has been described that each piece of input information is given with the aid of input commands. However, the information may also be given by another method such as screen editing.

The values which have been input via the keyboard 14 in steps 32 through 34 are stored in the main memory 13.

Then, in step 35, from the values of the distances between the optical subsystems stored in the main memory 13, a decision is made as to whether before-focused condition data of the optical lens system should be generated.

This decision may be made, for example, in terms of the distance between the optical subsystems, and the generation of the condition data with respect to the optical system may be controlled based on the condition of the optical subsystem to which the largest number of distances between the optical subsystems are defined. Alternatively, there may be provided before step 35 a step (not shown) of defining the number of conditions of the optical lens system to be generated, and this number may be stored in the main memory 13 so that the number may be read out from the main memory 13 in step 35, and the loop for generating the condition data with respect to the optical system is executed the defined number times.

If a continuation of the loop generating the before-focused condition data of the optical system is decided in step 35, then step 36 is executed.

In step 36, the values, which have been defined in steps 31–34 and which are stored in the main memory 13, are read out and the before-focused condition data of the optical lens system for use in the optical evaluation is generated and stored in the main memory 13.

The object position associated with the before-focused condition generated in this step has been specified in step 33.

In step 36, first, the data representing the shape of the lens is defined for each optical subsystem from the data of the lens configuration, and then the obtained data of the lens shape is allocated according to the data with respect to the optical subsystem. Then, the condition data of the optical subsystem for use in the optical evaluation is generated. The generation of the data may be performed in reverse order. With the optical CAD system, the design of the lens system is accomplished according to the following procedure. First, the data associated with the optical lens system is defined on the optical CAD system, and the target values to be satisfied such as aberration are defined. Then, the configuration data of the lens is specified as the variables and the optical evaluation is performed. The variables are modified to satisfy the given target values. Thus, optimization is carried out for the optical lens system.

In this case, the condition data of the optical system for use in the optical evaluation is generated in step 36 by using the data of the lens configuration which were specified as the variables.

Then, step 37 is executed. In step 37, the defined object position which is stored in the main memory 13, is read out. Then, according to the object position defined, the next step 38 will be repeated.

When it is determined that the conditions of the optical lens systems corresponding to the number of the positions of an object have been generated, processing returns to step 35.

In step 38, information is read out from the main memory 13 that represents the lens of the lens configuration of the optical lens system defined in step 34, for the same focal length, that is used as the focusing lens. Then, the CPU 11 calculates the amount of change in distance between lenses along the optical axis that is required to achieve coincidence of the conjugate position of the object position defined in the present loop with the evaluating position of the image. The before-focused condition data of the optical subsystem is read out from the main memory 13, and this data is modified from the above calculated result so as to generate after-focused condition data for use in the optical evaluation, and the generated data are stored in the main memory 13.

In step 38, in this way, the ultimate condition data is generated for the optical lens system for various distances between optical subsystems as shown in FIGS. 29–32.

Alternatively, an instruction may be given in step 34 to indicate whether focusing with respect to the position of the object is carried out to generate the condition data of the optical lens system, so that it is possible to select the generation of the data either as the after-focused condition data or as the before-focused condition data.

In the embodiment shown in FIG. 4, there may also be located just after step 38 a step (not shown in the figures) in which an optical evaluation is carried out based on the condition data generated in step 38 with respect to the optical system read out from the main memory 13, whereby the optical evaluation is carried out according to the evaluation-light information defined, or the step may be located at the point of return from step 35.

It has been described that the processing steps are executed in the order of step 31, then step 32, the step 33, and finally step 34. However, these steps may be executed in an arbitrary order as long as these steps are executed before step 35.

Furthermore, step 31, step 32, step 33, and step 34 may be grouped into one step, or, any two of these steps may be grouped into one step, or otherwise, any three of these steps may be grouped into one step.

Alternatively, any of steps 31, 32, 33 and 34 may be divided into arbitrary subfunctions.

Embodiment 4

Now, referring to the figures, embodiment 4, in accordance with the present invention, will be described in detail below.

Figure 5:
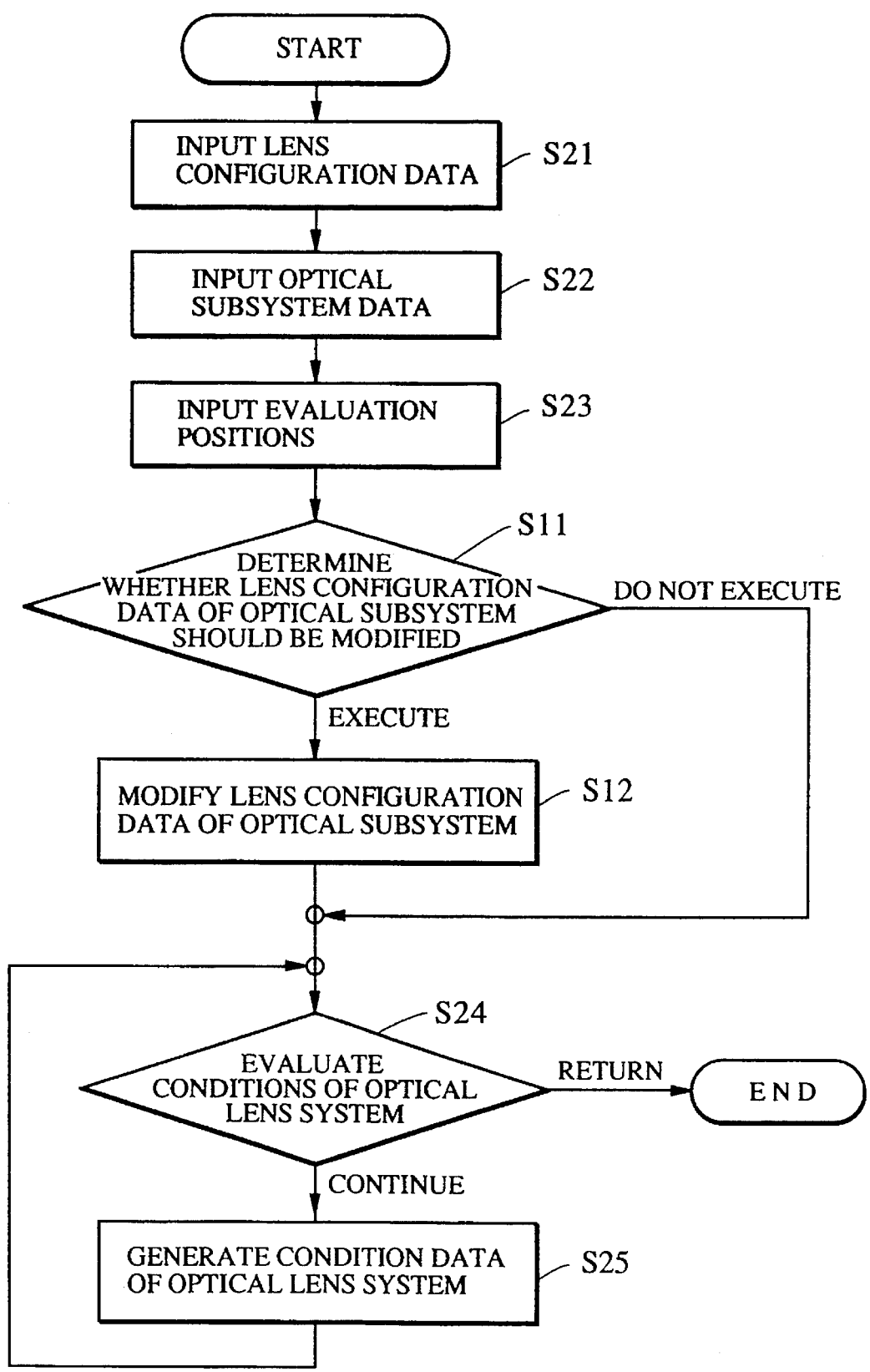
FIG. 5 is a flow chart which shows processing steps of embodiment 4, in accordance with the present invention.

FIG. 5 is a flow chart illustrating the processing steps in accordance with embodiment 4 of the present invention.

In embodiment 4, there are provided additional steps 11 and 12 between steps 23 and 24 of embodiment 2.

In step 22 of embodiment 4, the power of the optical subsystems is defined and it is designated which data associated with the lens configuration defined in step 31 is varied to satisfy the power of the optical subsystem defined.

In step 11, it is decided whether any data associated with the lens configuration should be varied to satisfy the condition of the given power of the optical subsystem.

If it is decided in step 11 that some data associated with the lens configuration should be varied to satisfy the condition of the given power of the optical subsystem, then step 12 is executed. If it is decided that step 12 should not be executed, then processing goes to step 24. In step 12, the designated data with respect to the lens configuration are modified to satisfy the defined power of the optical subsystems.

Again in embodiment 4, steps 21, 22, and 23 may also be executed in an arbitrary order as long as these steps are executed before step 11.

Furthermore, step 21, step 22, and step 23 may be grouped into one step, or, any two of these steps may be grouped into one step.

Alternatively, any of steps 21, 22, and 23 may be divided into arbitrary subfunctions.

Embodiment 5

Now, referring to the figures, embodiment 5, in accordance with the present invention, will be described in detail below.

Figure 6:
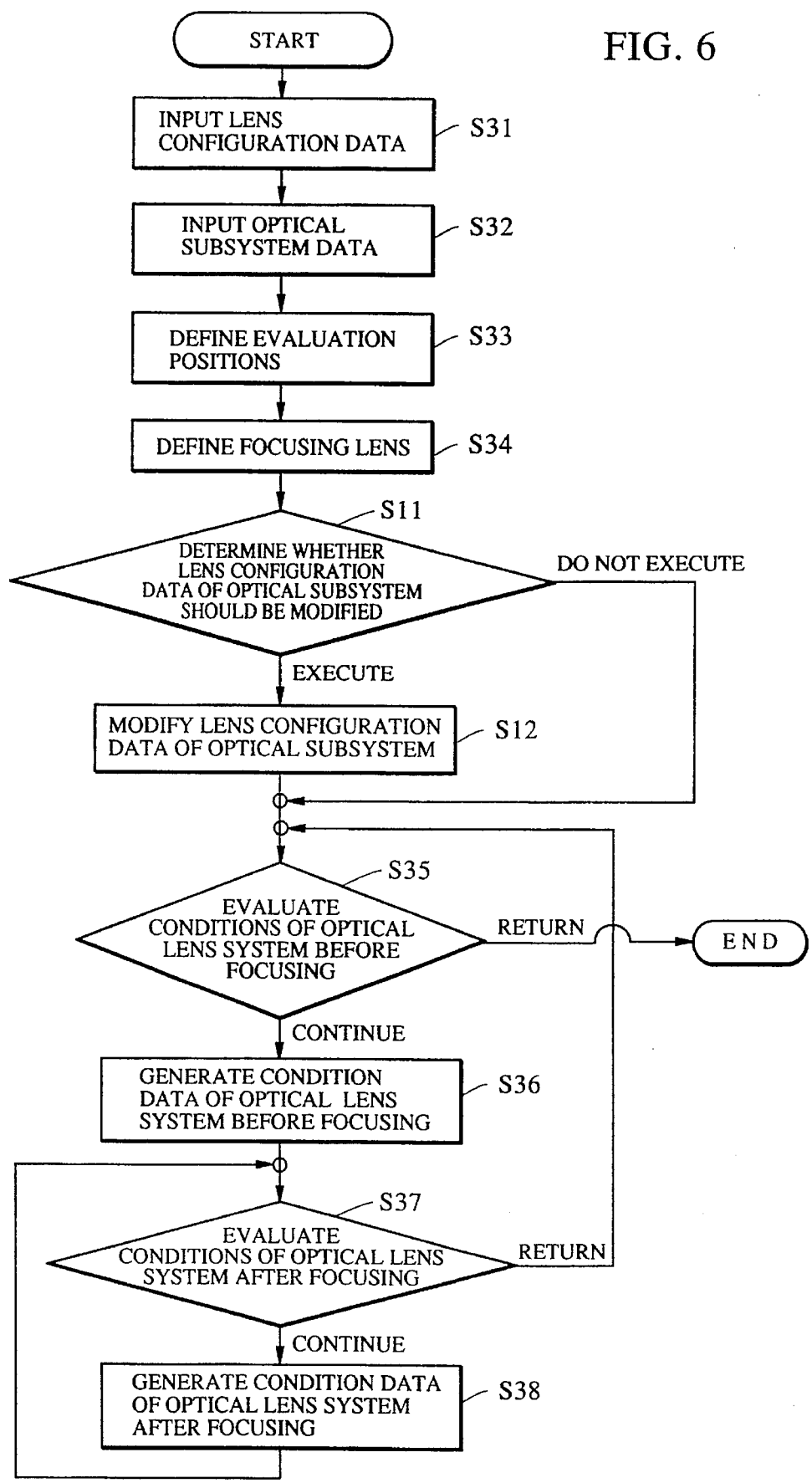
FIG. 6 is a flow chart which shows processing steps of embodiment 5, in accordance with the present invention.

FIG. 6 is a flow chart illustrating processing steps in accordance with embodiment 5 of the present invention.

In embodiment 5, there are provided the additional steps 11 and 12 between steps 34 and 35 of embodiment 3.

In step 32, as in the case of embodiment 4, the power of the optical subsystems is defined and it is designated which data associated with the lens configuration defined in step 31 are varied to satisfy the power of the optical subsystem defined for preparation of processing in later steps 11 and 12.

Also in embodiment 5, steps 31, 32, 33, and 34 may be executed in an arbitrary order as long as these steps are executed before step 12.

Furthermore, step 31, step 32, step 33, and step 94 may be grouped into one step, or, any two or three of these steps may be grouped into one step.

Alternatively, any of steps 31, 32, 33 and 34 may be divided into arbitrary subfunctions.

Embodiment 6

Now, referring to the figures, embodiment 6, in accordance with the present invention, will be described in detail below.

Figure 33:
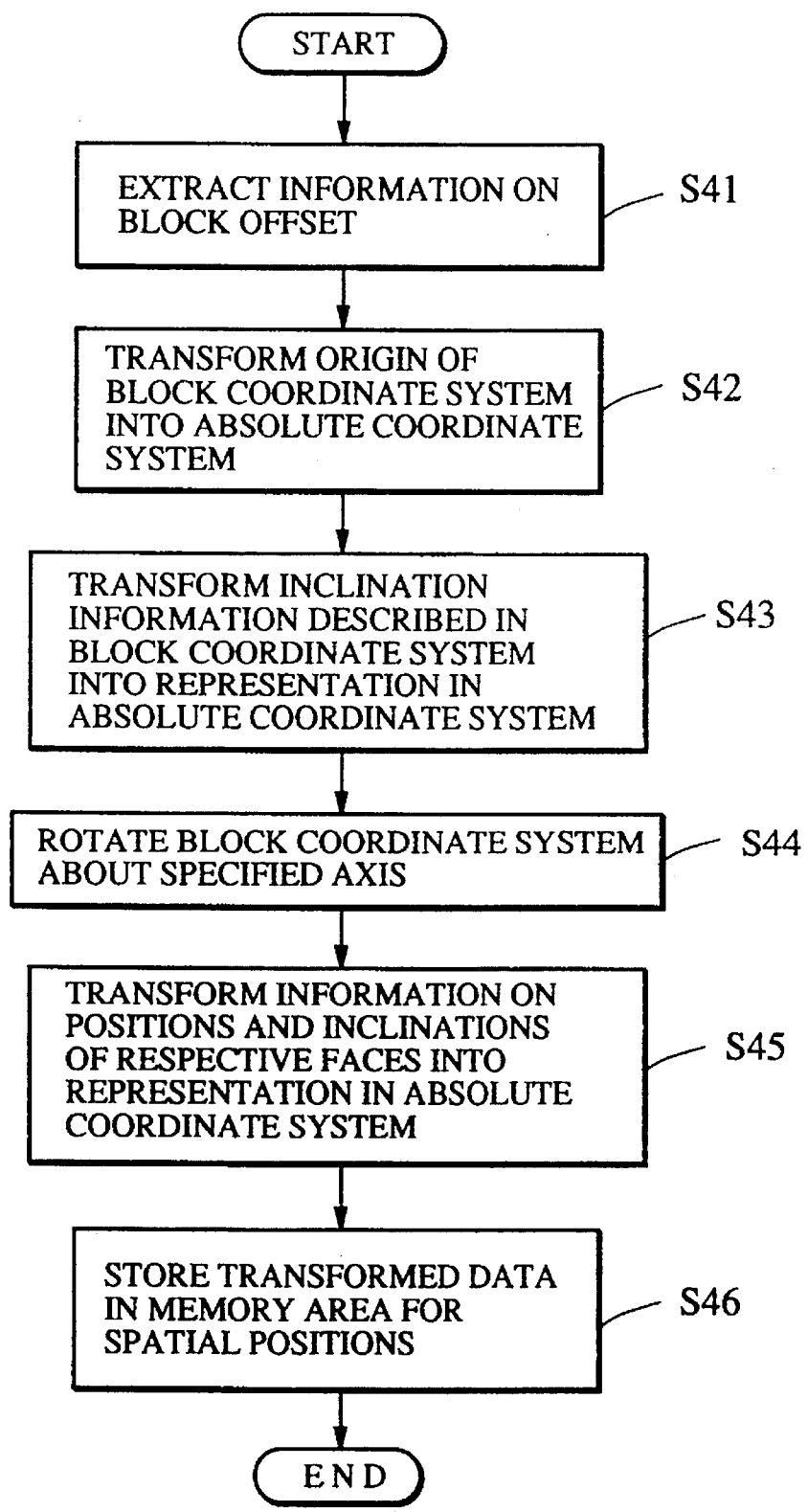
FIG. 33 is a flow chart which shows processing steps of embodiment 6 in accordance with the present invention.

FIG. 33 is a flow chart illustrating the processing steps in accordance with embodiment 6 of the present invention.

In the following description of embodiment 6, it is assumed that each piece of data has been already defined and stored in the main memory 13 as in embodiments 1–5.

Figure 34:
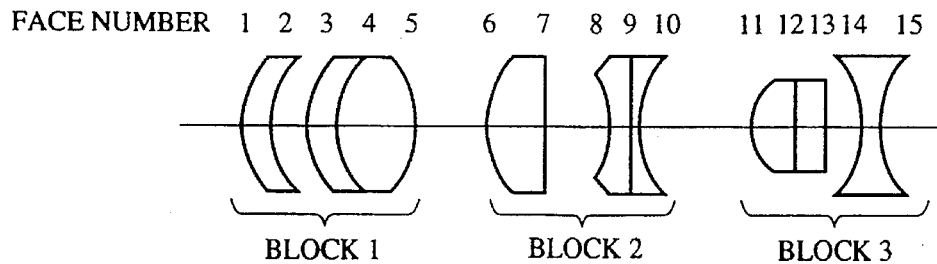
FIG. 34 is schematic diagrams illustrating blocks.

FIG. 34 is a schematic diagram showing blocks. A block is a combination of faces grouped into one unit. As shown in this figure, an optical system having fifteen faces is divided into three blocks, wherein a first block has faces 1 through 5, a second block has faces 6 through 10, and a third block has faces 11 through 15. As can been seen, the number of blocks is less than the number of faces.

Figure 35A:
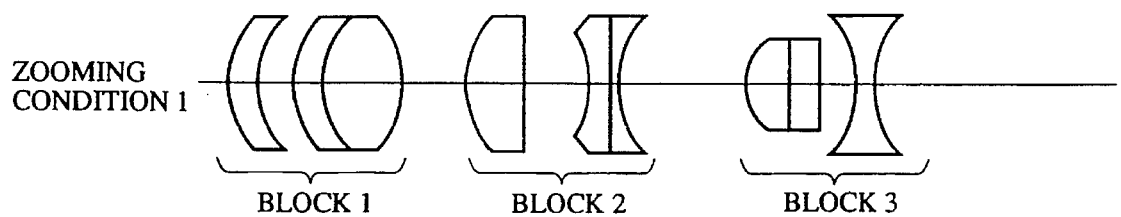
FIGS. 35A, 35B and 35C are schematic diagrams illustrating zooms.
Figure 35B:
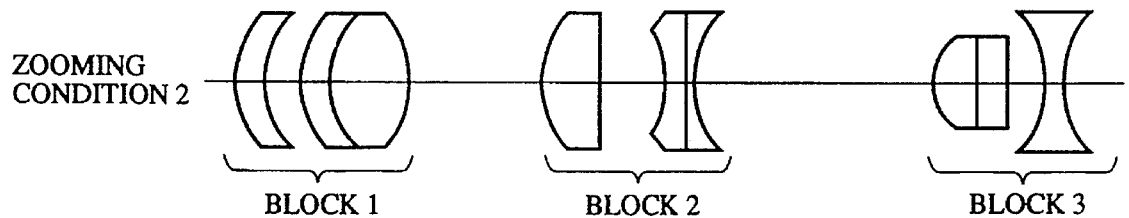
Figure 35C:
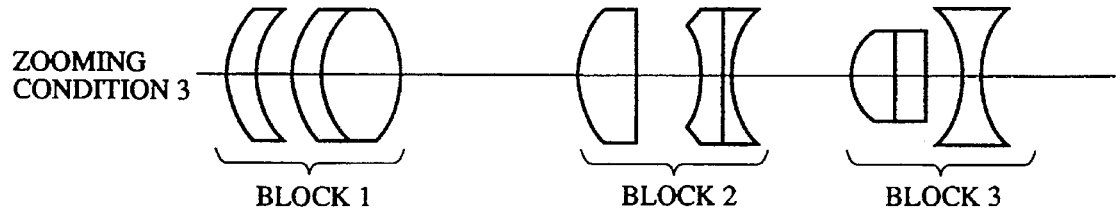

FIGS. 35A, 35B, and 35C are schematic diagrams illustrating zooming of the optical system.

Zooming refers to a change in the condition of an optical system. For example, in FIGS. 35A, 35B, and 35C, zooming refers to a change in the position of lens blocks 1–3.

FIG. 36 is a schematic diagram illustrating a decentered optical system.

A decentered optical system is an optical system in which coordinate systems associated with respective blocks do not coincide with the unified coordinate system.

Decentering information with respect to blocks is input via the keyboard 14, and is stored in the main memory 13.

Decentering information with respect to blocks includes the following four kinds of information:

(1) Information about coordinates of vertexes;
(2) Information about inclination of X- and Y-coordinate axes;

As for the above-described two kinds of information, the area required for the number of zooming conditions for each block is allocated in the main memory 13;

(3) Information about rotation; and
(4) Information about rotation angles.

As for the first two kinds of information described above, the area required for the number of blocks is allocated in the main memory 13.

The first step in FIG. 33 is that the decentering information, with respect to the first zooming condition, is read out from the main memory 13 (step 41).

Then, the origins of the block coordinate systems are transformed to the unified coordinate system (an absolute coordinate, for example) of the total system (step 42).

Then, the inclination information represented by the coordinate systems of the blocks (direction cosine, for example) is converted into a representation by the absolute coordinate system (step 43).

If rotation has been defined, the block coordinate systems that have been set in steps 42 and 43 are rotated about the designated rotation axis (step 44).

Then, information about face positions (vertex coordinates, for example) and information about inclination of each face (direction cosine of coordinate axes, for example) are converted into a representation by the absolute coordinate system (step 45).

As described above, the spatial arrangement is defined by the absolute coordinate system associated with the lens system in steps 41–45, and the arrangement information is stored in a spatial-arrangement area in the main memory 13, which is commonly used for all zooming conditions (step 46). The size, which can represent one zooming condition of the spatial-arrangement, is commonly used for all zooming conditions.

In the steps up to 46, the arrangement of the decentered optical system is defined for the first zooming condition.

Then, if the inclination information with respect to the second zooming condition has been defined in the main memory 13, the inclination information with respect to the second zooming condition is extracted and the arrangement information of the decentered optical system is stored in the spatial-arrangement area used for all zooming conditions in step 46.

That is, if the inclination information to be extracted from the main memory 13 has been defined corresponding to the number of zooming conditions, then the extraction is repeated a number of times equal to the number of zooming conditions so as to obtain spatial arrangement information for each zooming condition.

By defining zooming information with respect to each block instead of defining it with respect to each face, it becomes possible to perform processing on the optical system with less memory area.

Embodiment 7

Now, referring to the figures, embodiment 7, in accordance with the present invention, will be described in detail below.

Figure 37:
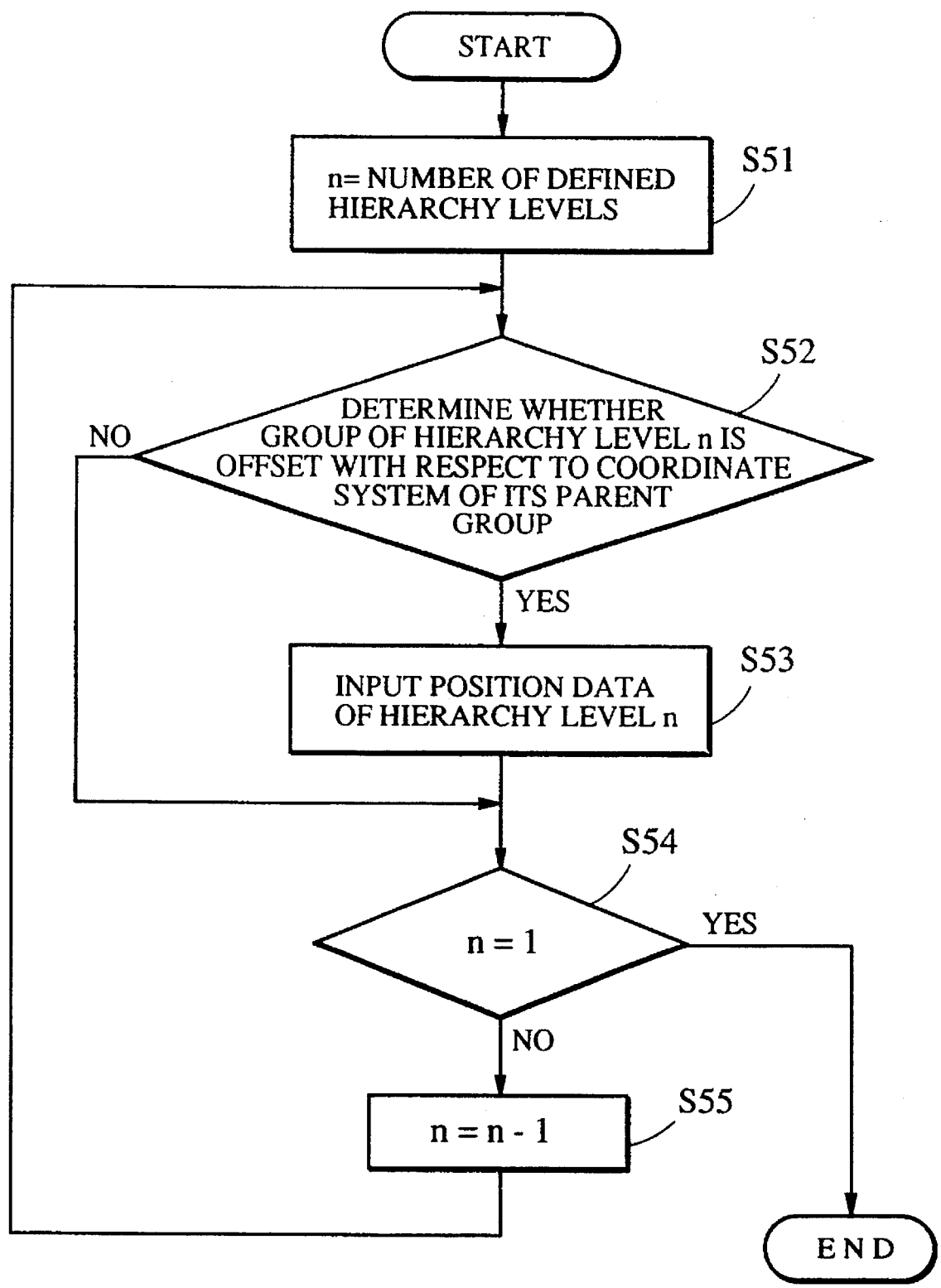
FIG. 37 is a flow chart that shows the processing steps of embodiment 7, in accordance with the present invention.

FIG. 37 is a flow chart illustrating the processing steps in accordance with embodiment 7 of the present invention.

In the following description of embodiment 7, it is assumed that each piece of data has been already defined and stored in the main memory 13 as in embodiments 1–5.

First, a hierarchy level number is input via the keyboard 14 so as to define the number of arrangement hierarchy levels (n) (step 51).

Then, it is decided whether the (n)the hierarchy groups are decentered from the reference coordinate associated with their parent hierarchy group based on the information input via the keyboard 14 (step 52).

If decentering exists, arrangement data, with respect to the decentered groups in the (n)the hierarchy group, is input via the keyboard 14 (step 53).

If the hierarchy level number is equal to 1 (which corresponds to each face), the processing on the arrangement data is completed (step 54).

In step 54, if n is not equal to 1, then n is decremented by 1 to set up for the next hierarchy groups (step 55).

Figure 38:
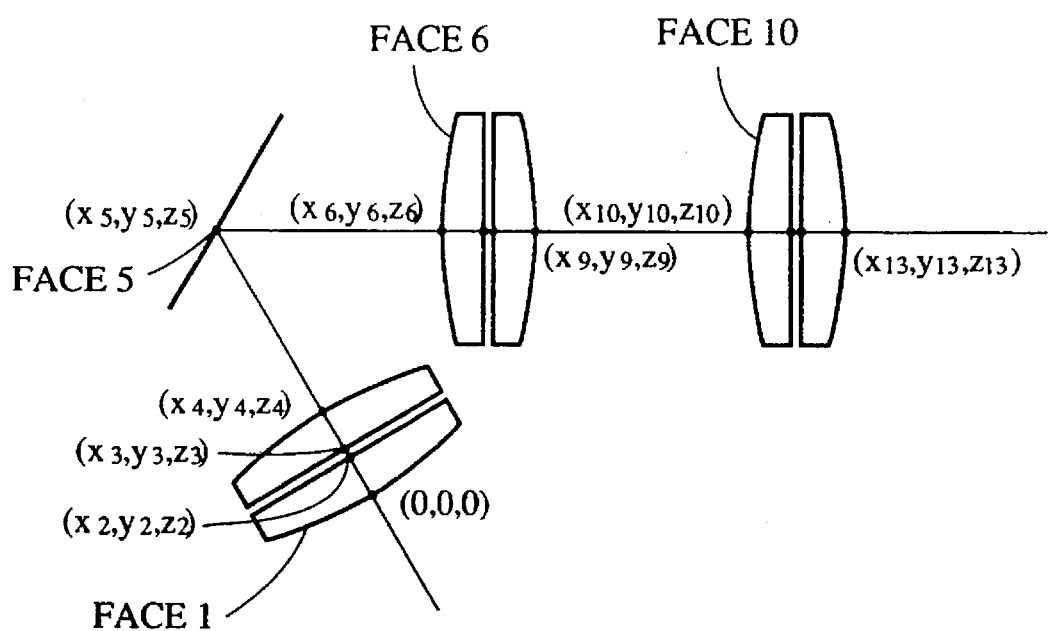
FIG. 38 is a schematic diagram illustrating an optical system before grouping is carried out.
Figure 39:
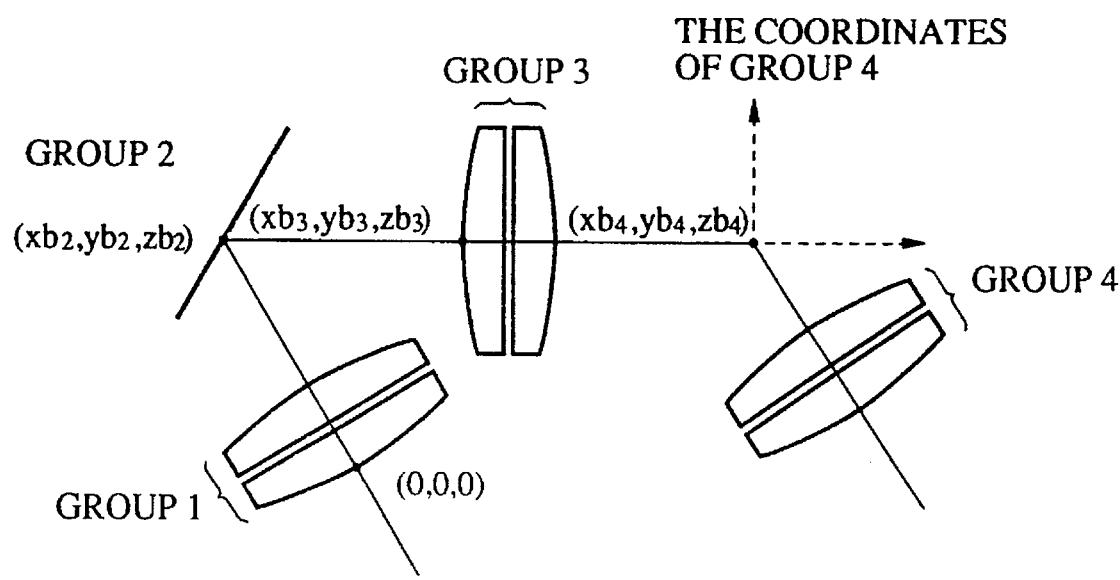
FIG. 39 is a schematic diagram illustrating an optical system which has been divided into groups in accordance with embodiment 7.
Figure 40:
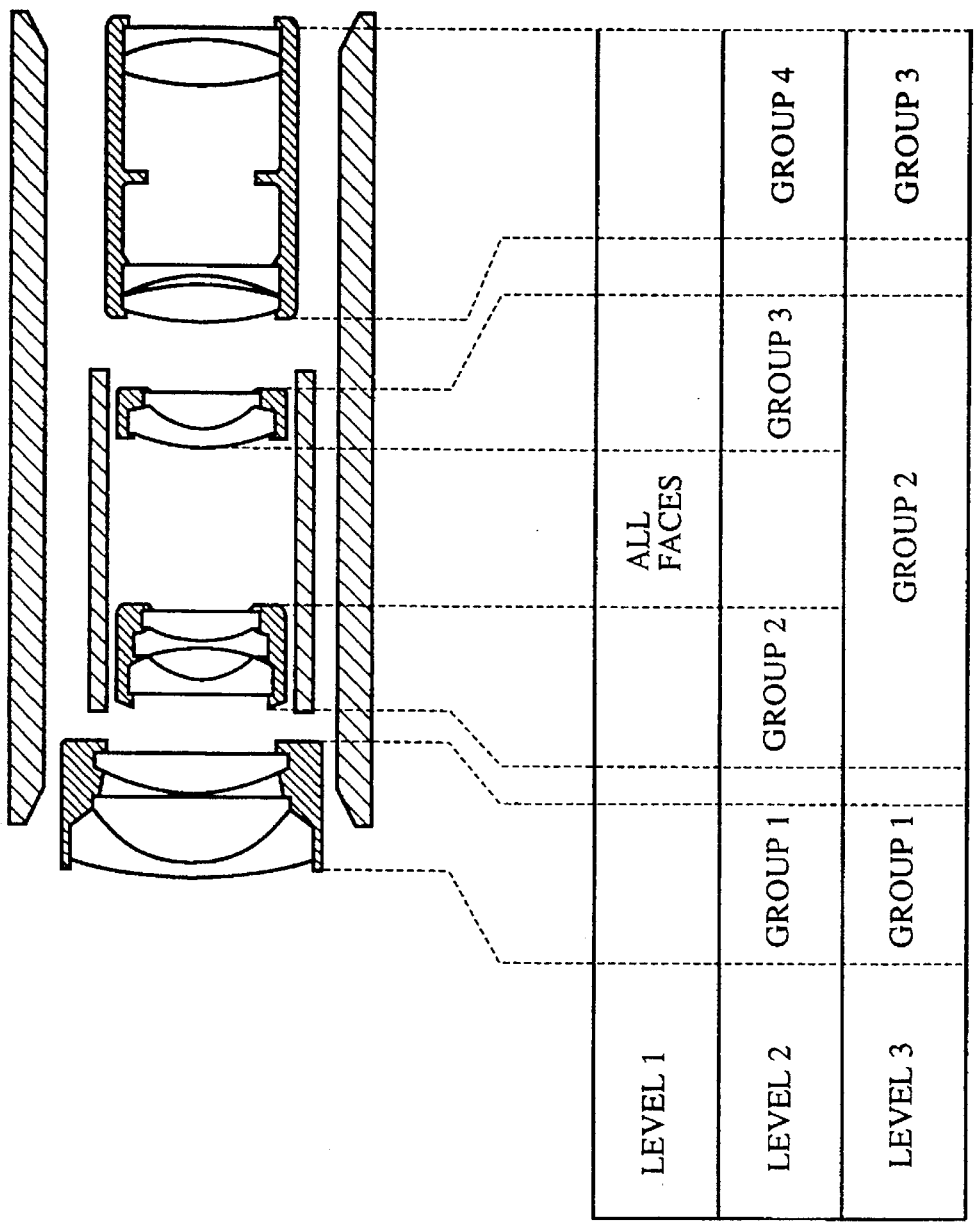
FIG. 40 is a schematic diagram illustrating an optical system which has been divided into groups in accordance with embodiment 7.
Figure 41:
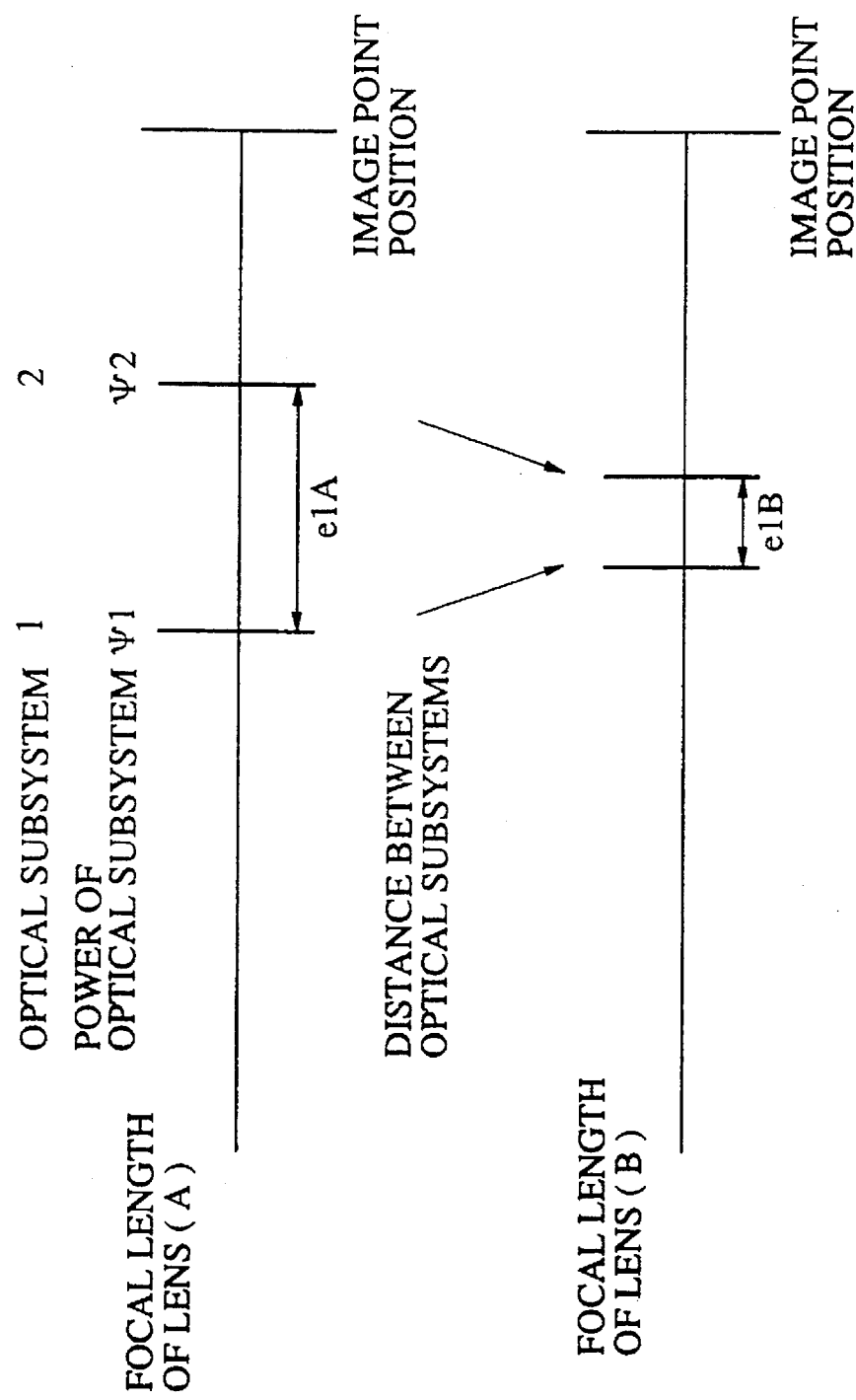
FIG. 41 is a schematic diagram illustrating a conventional embodiment.
Figure 42:
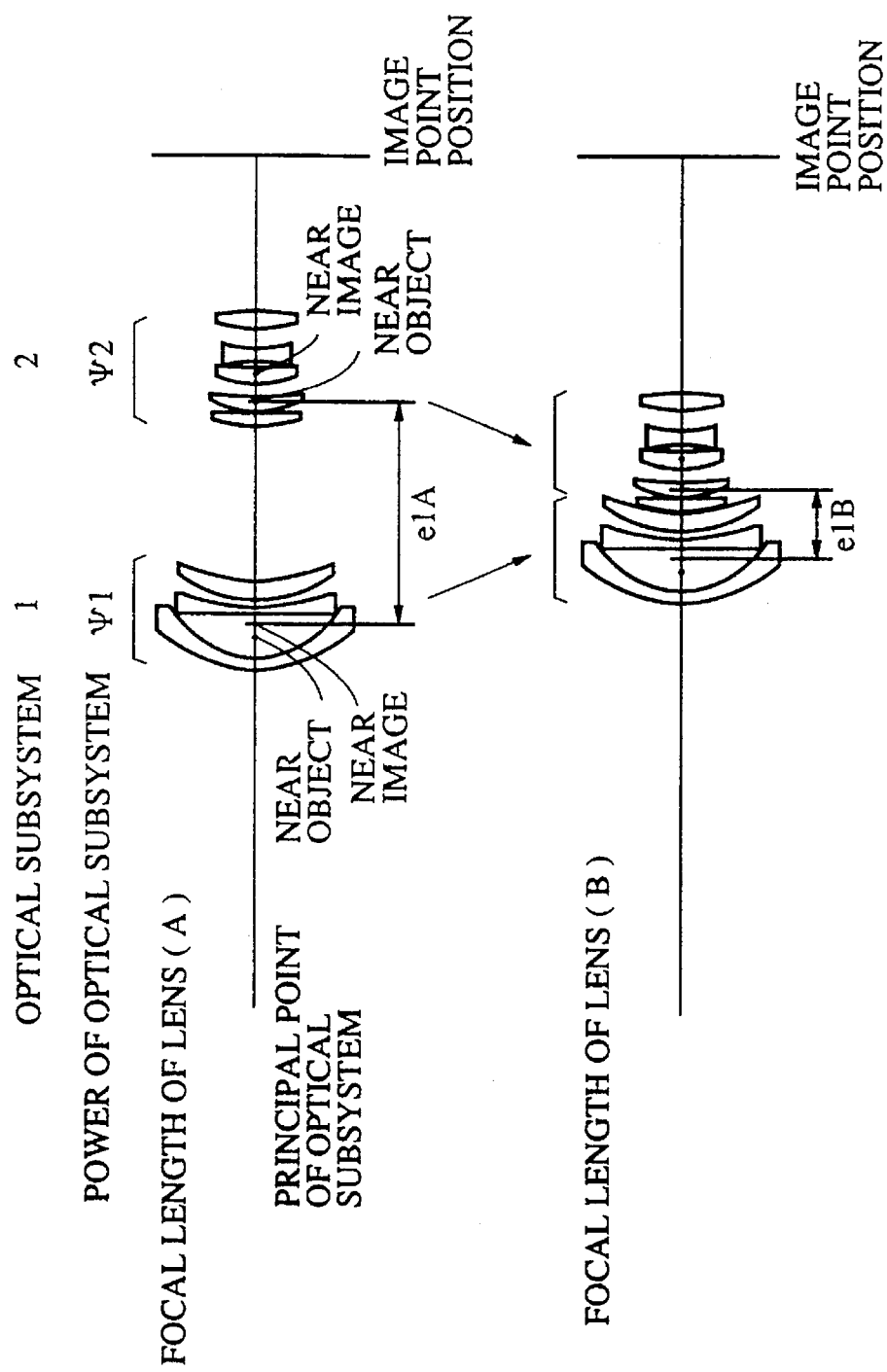
FIG. 42 is a schematic diagram illustrating a conventional embodiment.
Figure 43:
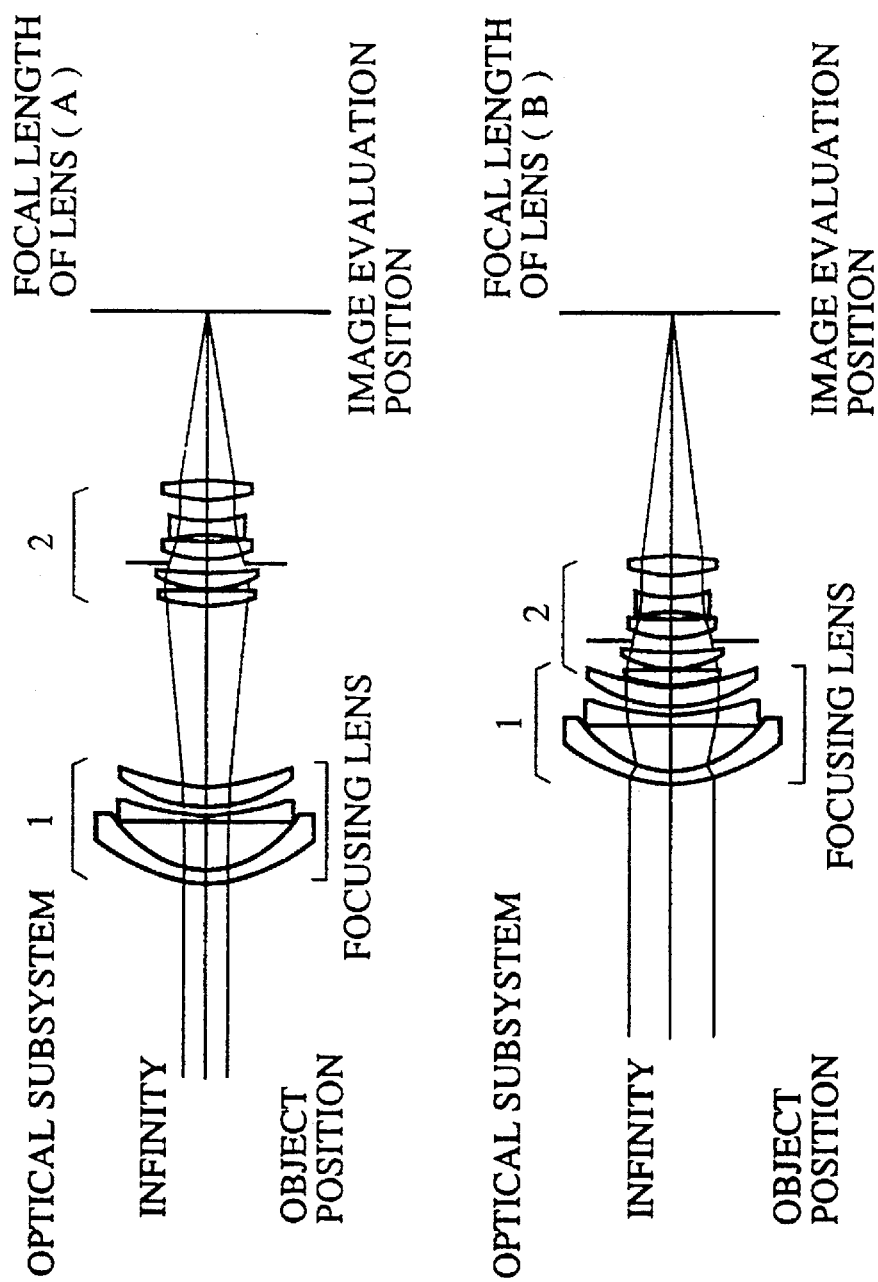
FIG. 43 is a schematic diagram illustrating a conventional embodiment.
Figure 44:
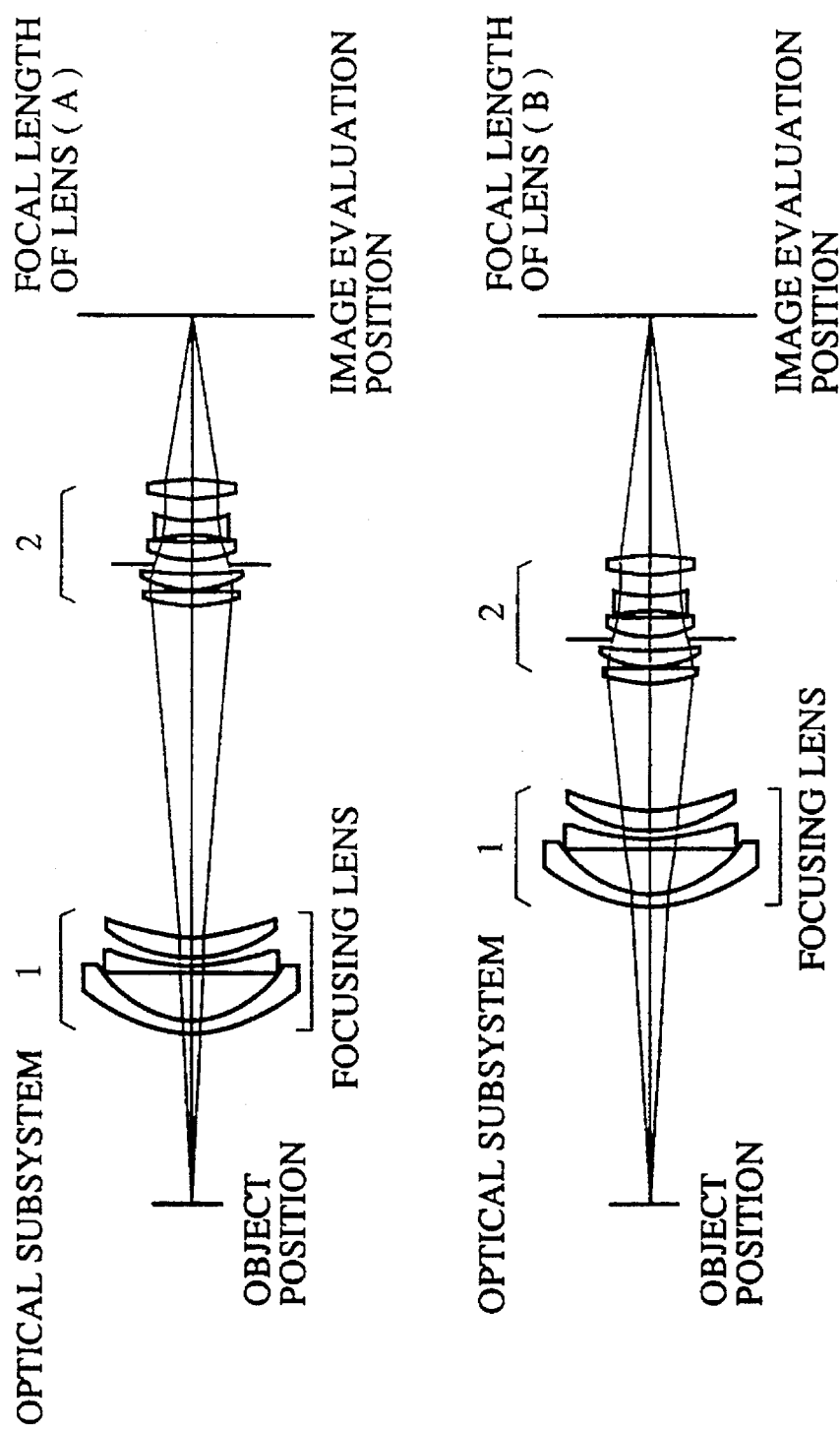
FIG. 44 is a schematic diagram illustrating a conventional embodiment.

Referring to FIGS. 38–40, the grouping into hierarchy groups and the coordinate system will be described in more detail below.

The data to be defined is data on the coordinates of the origins of the coordinate systems associated with groups and on the inclination of the coordinate systems and the like. For simplicity, the following description will focus on the coordinates of the origins of the coordinate systems associated with the groups. Groups belonging to a certain hierarchy group are referred to as child groups, and a group which provides a reference coordinate system that may be used to define the arrangement of groups is referred to as the parent group.

FIG. 38 is a schematic diagram illustrating an optical system which is not divided into groups yet. In the case of FIG. 38, data for all the lens faces (faces 1–13) should be input with respect to the coordinate system that is common for the entire optical system.

FIG. 39 is a schematic diagram illustrating an optical system which is divided into groups according to the present embodiment. FIG. 39 shows an example having first and second hierarchy levels, wherein the first hierarchy level includes all lens faces, and the second hierarchy level includes a group i consisting of lens faces 1–4, a group 2 consisting of a lens face 5, a group 3 consisting of lens faces 6–9, and a group 4 consisting of lens faces 10–13.

The groups belonging to the first hierarchy level are a child group of a group belonging to the second hierarchy level, and the groups belonging to the second hierarchy level are a parent group of a groups belonging to the first hierarchy level.

The data with respect to the structure of hierarchy groups is defined for example before the arrangement data is input in such a manner as described in connection with the embodiment 1. The data with respect to the structure of the hierarchy groups includes the starting lens face of a group, the number of lens faces included in a group, and the like. The hierarchy grouping may be done in terms of roles (for example, magnifications) or in terms of arrangement.

First, using the vertex of the lens face 1 as the origin of the coordinate system which is common for the entire optical system as in the case of FIG. 38, the coordinate system for the second hierarchy level is defined.

Because the parent group of the group that is located at the most outer position is the entire optical system itself, the coordinate system for groups belonging to the second hierarchy level is the coordinate system associated with their parent group, i.e., in this case, the coordinate system common for the entire optical system (absolute coordinate system).

When the position of group 1 is defined, if the origin of the coordinate system associated with the group 1 is made coincident with the origin of the coordinate system common for the entire optical system, then the origin of the coordinate system of group 1 becomes (0, 0, 0).

As for group 2 shown in FIG. 39, the origin of the coordinate system associated with group 2, (xb2, yb2, zb2), is transformed to a representation by the common coordinate system of the entire optical system. Furthermore, the origin of the coordinate system associated with the group 3, (xb3, yb3, zb3), and the origin of the coordinate system associated with the group 4, (xb4, yb4, zb4), are transformed in a similar manner. In each group, simple data such as the distance to the vertex of the first face is defined before the coordinate system transformation.

If a child group is not decentered with respect to the coordinate system associated with its parent group, then its position is directly defined by using simple data such as the distance to the vertex of the first face.

If a child group is decentered with respect to the coordinate system associated with its parent group, then the position of the child group is defined by using a relative system seen from the coordinate system associated with the parent group.

Regarding groups 1, 2, and 3 which are shown in FIG. 39, the origins of the coordinate systems associated with the respective groups are coincident with their vertexes.

Regarding group 4, child groups (each face, in this case) are decentered with respect the coordinate system of their parent group.

If required, groups belonging to the second hierarchy level may be grouped into their parent groups which form the third hierarchy level.

FIG. 40 shows an example in which the optical system is divided into groups in three hierarchy levels. The group located at the most outer position belongs to the parent group which coincides with the entire optical system.

As can be seen from the above description, a three-dimensional arrangement may be easily defined for a complicated optical system.

In the example described above, position information associated with each group is given as the coordinates relative to the coordinate system of its parent group. However, position information may also be defined relative to the coordinate system of a previous group in the same group. To this end, the coordinate system by which positions will be defined may be selected from two or more different coordinate systems.

Furthermore, in some cases, absolutely the same data associated with each optical element forming an optical system may result in various optical magnifications (zooming) depending on its position. In this case, it will be wasteful to have configuration data associated with optical component elements of the optical system for each optical magnification. With one set of configuration data associated with an optical system, the conditions corresponding to various optical magnifications (zooming) may be defined by having respective arrangement data in terms of hierarchy groups for each optical magnification.

In the example described above, successive child groups were grouped into one group. Instead, child groups that are not adjacent to each other may also be grouped into one group and the position information may be defined relative to the group formed in this way.

According to the present embodiment, as described above, it is possible to easily define condition data of an optical lens system for a specific lens configuration that satisfies the power arrangement which has been defined at an early stage of the development. Thus, it is possible to easily define the condition data of an optical lens system such as a zoom lens system and it is possible to easily evaluate it.

The condition data of an optical lens system to be evaluated with respect to its optical characteristics may be modified from the before-focusing condition data of the optical system to the after-focusing condition data of the optical system corresponding to the object position, whereby it becomes possible to easily make an optical evaluation on an optical lens system such as a zoom lens system, in which the focal length of the optical lens system may vary continuously, for a plurality of object positions.

In the optical evaluation of an optical lens systems for various object positions using the same focal length, it is possible to calculate the focused-condition data of the optical lens system in which respective conjugate planes of various object positions are made coincident with the evaluating position of the image. The face numbers of the lens faces that are to be moved for focusing are specified, and the lens face spacings inherent to the respective specified lens faces may be defined based on the above calculated result. Thus, it is possible to generate the data for use in the optical evaluation of the optical system without re-defining the data as the data of a different optical lens system, whereby it becomes possible to easily perform an optical evaluation.

Figure 45:
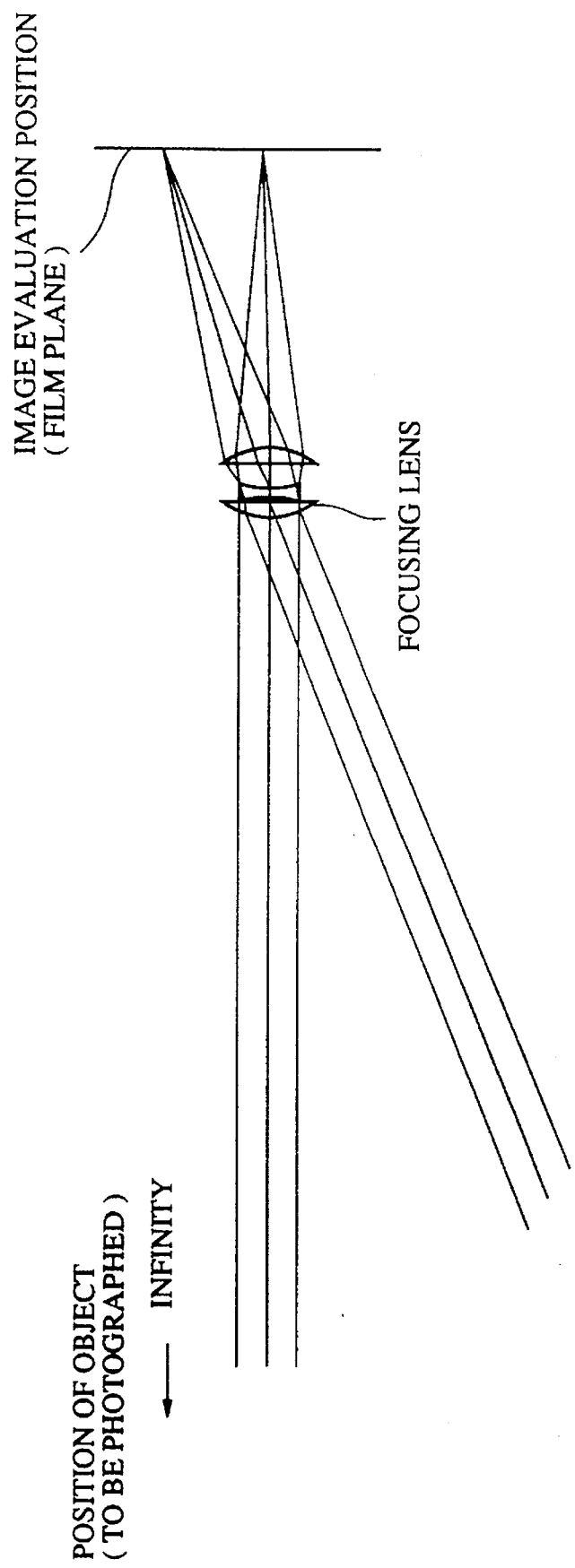
FIG. 45 is a schematic diagram illustrating a conventional embodiment.
Figure 46:
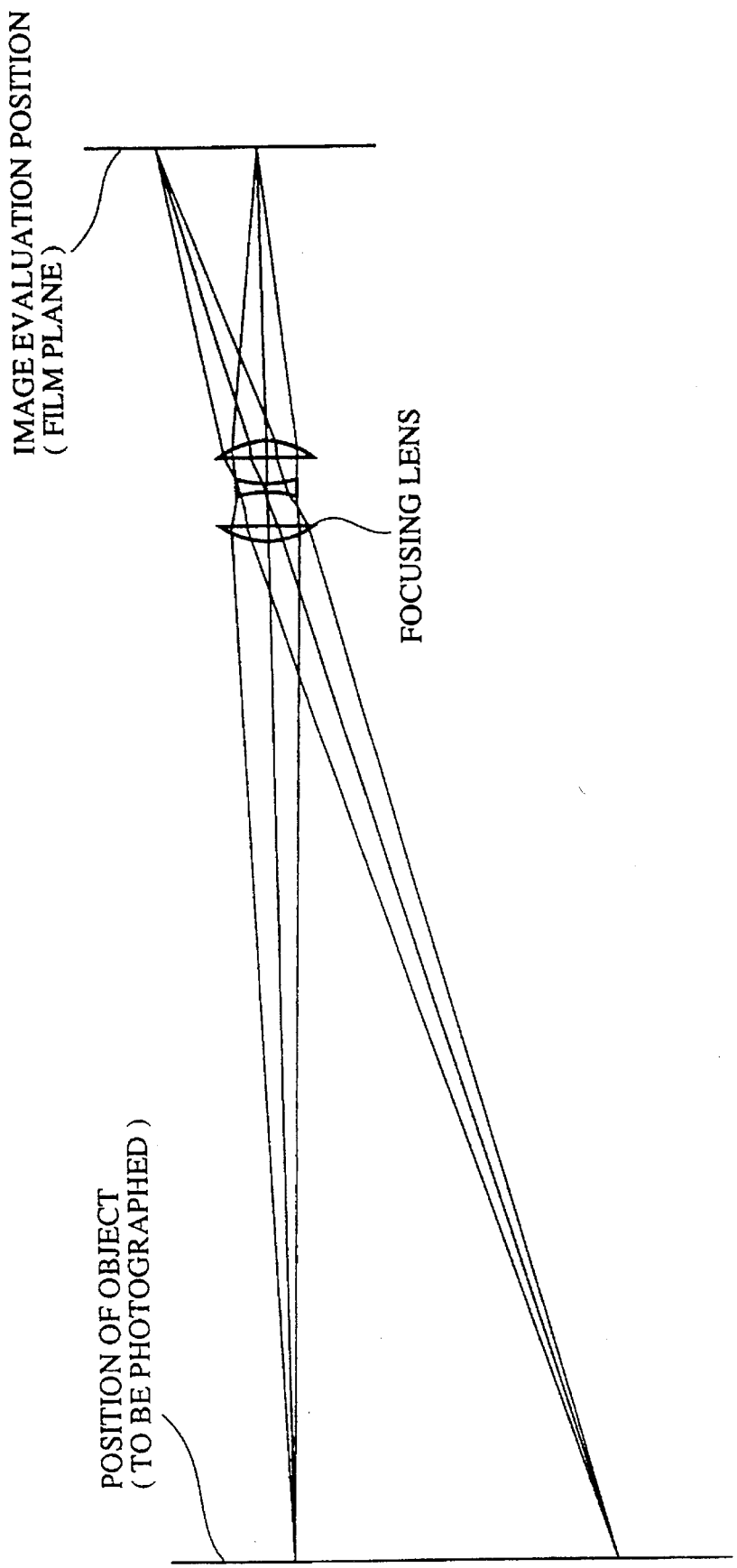
FIG. 46 is a schematic diagram illustrating a conventional embodiment.
Figure 47:
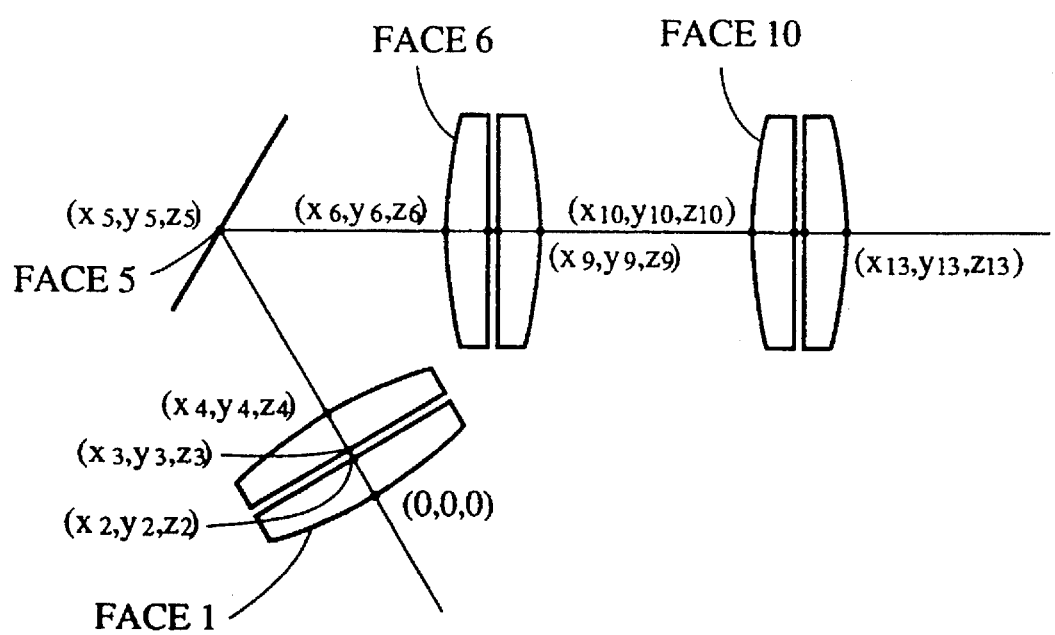
FIG. 47 is a schematic diagram illustrating a conventional embodiment.

For example, in the case of an evaluation on a camera optical system, as shown in either FIG. 45 or 46, under the condition where the focusing is performed for two different positions of an object to be photographed, e.g., an infinite distance and a short distance, by making the conjugate planes of respective object positions coincident with the evaluating position of the image, the data is defined for the condition of the optical lens system shown in FIG. 45, and if an additional object position (b) is defined, then the data corresponding to the condition of the optical system shown in FIG. 46 may also be generated. Thus, it becomes possible to easily perform optical evaluation for arbitrary object positions.

Furthermore, in the case of the design of an optical lens system with an optical CAD system in which optimization is performed by varying lens configuration data as variables, it is possible to easily optimize the optical system to satisfy all the target values which have been defined for a plurality of arbitrary object positions.

It also becomes possible to solve the problem that if a memory area is declared for spatial arrangements of lens faces in decentered optical system for each of various zooming conditions, then an unnecessarily large size of memory area is required. In addition, even if the number of zooming conditions become larger, there is no influence on the memory area for the spatial arrangement.

Furthermore, two or more hierarchy groups may be defined in an optical system and the positions of the groups in each hierarchy level may be defined relative to the coordinate system associated with their parent group, whereby it becomes possible to easily input position data of the optical system and it also becomes possible to reduce input errors.

In accordance with the present invention, as described above, the data of optical subsystems and the configuration data of lenses forming these optical subsystems are input, and then, from these data, the condition data of the optical system for use in optical evaluation is generated. Thus, it is possible to easily define an optical system such as a zoom lens system on an optical CAD system according to the actual development steps of an optical lens system.

Except as otherwise disclosed herein, the various components shown in outline or in block form are individually well-known and their internal construction and operation is not critical either to the making or using of this invention or to a description of the best mode of the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretations so as to encompass all such modifications and equivalent structures and functions.

What is claimed is:

1. An information processing system for processing information regarding a lens system, said processing system comprising:

configuration definition means for receiving input lens system data and for generating data defining the configuration of the lens system;

block definition means for receiving block composition data and for generating data defining an arrangement of a plurality of blocks that form the configuration of the lens system;

position definition means for receiving at least one of object and image position data and for generating data defining evaluating-positions for the lens system in accordance with at least one of the object and image position data; and arrangement means for arranging lenses within the lens system based on the respective data generated by said configuration definition means, said block definition means and said position definition means.

2. An information processing system according to claim 1, further comprising block designation means for receiving block mobility data and for generating data designating each of the blocks as either a movable block or a fixed block.

3. An information processing system according to claim 1, wherein said arrangement means arranges the lenses within the lens system for each of the evaluating positions defined by said position definition means.

4. An information processing system according to claim 1, further comprising:

output means for outputting an arrangement of lenses arranged by said arrangement means.

5. An information processing system for processing information regarding a lens system, said processing system comprising:

configuration definition means for receiving input lens system data and for generating data defining the configuration of the lens system;

designation means for receiving the lens system configuration data from said configuration definition means and for designating a reference lens from the lenses within the lens system defined by said configuration definition means;

block defining means for receiving block composition data defining a block having the reference lens designated by said designation means, and dependent lenses which are not designated by said designation means;

arrangement definition means for receiving the data regarding the block defined by said block defining means and for defining a position of the reference lens in the block; and re-arrangement determining means for determining a re-arrangement of the dependent lenses relative to the reference lens in accordance with the position of the reference lens defined by said arrangement defining means.

6. An information processing system according to claim 5, wherein said re-arrangement determining means determines a re-arrangement of the dependent lenses within the lens system for each position of the reference lens defined by said arrangement definition means.

7. An information processing system according to claim 5, wherein said arrangement definition means defines a position of the reference lens based on lens decentering information.

8. An information processing system according to claim 5, further comprising:

output means for outputting the re-arrangement of the dependent lenses determined by said re-arrangement determining means, and a position of the reference lens defined by said arrangement definition means.

9. A method for processing information regarding a lens system, said method comprising the steps of:

generating configuration data regarding the configuration of lenses within the lens system in accordance with input lens system data;

defining the arrangement of a plurality of blocks that form the configuration of the lens system in accordance with block composition data and the lens system configuration data generated in said generating step;

generating evaluating-position data regarding evaluating-positions for evaluating the configuration of the lens system in accordance with at least one of object and image position data; and arranging the lenses within the lens system based on the generated lens system configuration data, the defined arrangement of the plurality of blocks, and the generated data regarding the evaluating-positions.

10. A method according to claim 9, further comprising the step of designating each of the blocks as either a movable block or a fixed block.

11. A method according to claim 9, wherein said step of arranging the lenses is performed for each of the generated evaluating positions.

12. A method for processing information regarding a lens system, said method comprising:

generating lens system configuration data regarding the configuration of lenses within the lens system in accordance with input lens system data;

designating a reference lens from the lenses within the lens system in accordance with the lens system configuration data generated in said generating step;

defining, in accordance with block composition data, a block comprising the reference lens designated by said designating step, and dependent lenses, which are not designated in said designating step;

determining the position of the reference lens within the lens block defined in said defining step; and arranging the dependent lenses relative to the reference lens arranged in said arranging step, in accordance with the lens block defined in said defining step.

13. A method according to claim 12, wherein the step of arranging the dependent lenses is performed for each of a plurality of positions determined for the reference lens in said determining step.

14. A method according to claim 12, wherein the step of determining the position of the reference lens is performed based on lens decentering information.

* * * * *

UNITED STATES PATENT AND TRADEMARK OFFICE
CERTIFICATE OF CORRECTION

PATENT NO. : 5,563,807

DATED : October 8, 1996

INVENTOR(S) : Kashiwagi et al.

Page 1 of 3

It is certified that error appears in the above-indentified patent and that said Letters Patent is hereby corrected as shown below:

Title page, item [56], OTHER PUBLICATIONS:

"GENTI-PC" should read --GENII-PC--.

COLUMN 5:

Line 21, "means;" should read --means; and--;
Line 31, "means;" should read --means; and--; and
Line 48, "lens" (first occurrence) should read --the lenses--.

COLUMN 8:

Line 34, "character" (last occurrence) should read --characters--.

COLUMN 12:

Line 39, "1074" should read --1704--;
Line 60, "reference numeral" should read --Reference numerals--; and
Line 64, "defined," should read --defined, and--.

UNITED STATES PATENT AND TRADEMARK OFFICE
CERTIFICATE OF CORRECTION

PATENT NO. : 5,563,807
DATED : October 8, 1996
INVENTOR(S) : Kashiwagi et al.

It is certified that error appears in the above-indentified patent and that said Letters Patent is hereby corrected as shown below:

COLUMN 16:

Line 32, "the" should be deleted, and "a" should read --to a--.

COLUMN 17:

Line 18, A new paragraph should begin with "With the optical".

COLUMN 19:

Line 1, "94" should read --34--.

COLUMN 20:

Line 41, "the(n)the hierarchy groups are" should read --the(n)th hierarchy group is--; and
Line 47, "the(n)the hierarchy group," should read --the(n)th hierarchy group,--.

COLUMN 21:

Line 16, "groups" should read --group--; and
Line 66, "respect" should read --respect to--.

UNITED STATES PATENT AND TRADEMARK OFFICE
CERTIFICATE OF CORRECTION

PATENT NO. : 5,563,807
DATED : October 8, 1996
INVENTOR(S) : Kashiwagi et al.

It is certified that error appears in the above-indentified patent and that said Letters Patent is hereby corrected as shown below:

<u>COLUMN 22</u>:

Line 51, "systems" should read --system--.

<u>COLUMN 23</u>:

Line 18, "in" should read --in the--; and
   Line 51, "interpretations" should read
      --interpretation--.

<u>COLUMN 24</u>:

Line 38, A new paragraph should begin with
      "re-arrangement".

Signed and Sealed this

Fifteenth Day of April, 1997

Attest:

BRUCE LEHMAN

*Attesting Officer*     *Commissioner of Patents and Trademarks*